United States Patent
Yoshihara et al.

(10) Patent No.: US 11,909,776 B2
(45) Date of Patent: Feb. 20, 2024

(54) ONLINE VIDEO DISTRIBUTION SUPPORT METHOD, ONLINE VIDEO DISTRIBUTION SUPPORT APPARATUS AND ONLINE VIDEO DISTRIBUTION SUPPORT SYSTEM

(71) Applicant: PANASONIC INTELLECTUAL PROPERTY MANAGEMENT CO., LTD., Osaka (JP)

(72) Inventors: Takeshi Yoshihara, Fukuoka (JP); Koji Horiuchi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 188 days.

(21) Appl. No.: 17/704,107

(22) Filed: Mar. 25, 2022

(65) Prior Publication Data
US 2022/0311808 A1   Sep. 29, 2022

(30) Foreign Application Priority Data
Mar. 29, 2021  (JP) ................................ 2021-055470

(51) Int. Cl.
*H04L 65/1059*   (2022.01)
*H04L 65/403*    (2022.01)
*G06V 40/18*     (2022.01)

(52) U.S. Cl.
CPC .......... *H04L 65/1059* (2013.01); *G06V 40/18* (2022.01); *H04L 65/403* (2013.01)

(58) Field of Classification Search
CPC ............... H04L 65/1059; H04L 65/403; H04L 65/4015; G06V 40/18; G06V 10/764; G06V 10/82; G06V 20/52; G06F 16/436; G06F 16/4393

See application file for complete search history.

(56) References Cited

U.S. PATENT DOCUMENTS 11,228,625 B1 *    1/2022  Libin .................... G06V 40/176
2022/0150288 A1 *  5/2022  Tokuchi ............. H04N 21/4781

FOREIGN PATENT DOCUMENTS

JP    2016-114684 A     6/2016
JP    2016114684   *    6/2016  ............. G09B 19/00

* cited by examiner

*Primary Examiner* — Yosef K Laekemariam
(74) *Attorney, Agent, or Firm* — GREENBLUM & BERNSTEIN, P.L.C.

(57) ABSTRACT

An online video distribution support method is executed by an online video distribution support system including one or more computers connected to communicate with a plurality of viewer terminals used by viewers who view an online video. The online video distribution support method includes: displaying a video distribution screen including a material designated by a distributor that distributes the online video; acquiring information on a line-of-sight position of each of the viewers on the video distribution screen from each of the viewer terminals; detecting and acquiring a line-of-sight position of the distributor on the video distribution screen by using a captured image obtained by capturing the distributor; and calculating and outputting a degree of interest of each of the viewers based on the line-of-sight position of the corresponding viewer and the line-of-sight position of the distributor.

11 Claims, 17 Drawing Sheets

FIG. 9

<DISPLAY ORDER WHEN SWITCHING TO (k+1)TH SLIDE>   TB1

| VIEWER | | DEGREE OF INTEREST | DISPLAY ORDER |
|---|---|---|---|
| A | SCA | 0.28 | 4 |
| B | SCB | 0.13 | 2 |
| C | SCC | 0.21 | 3 |
| D | SCD | 0.09 | 1 |
| E | SCE | 0.62 | 5 |
| F | SCF | 0.82 | 9 |
| G | SCG | 0.81 | 8 |
| H | SCH | 0.69 | 6 |
| I | SCI | 0.79 | 7 |

FIG. 10

<DISPLAY ORDER WHEN SWITCHING TO (k+2)TH SLIDE>　　TB2

| VIEWER | DEGREE OF INTEREST | DISPLAY ORDER |
|---|---|---|
| SCA — A | 0.69 | 7 |
| SCB — B | 0.64 | 6 |
| SCC — C | 0.86 | 8 |
| SCD — D | 0.93 | 9 |
| SCE — E | 0.55 | 5 |
| SCF — F | 0.53 | 4 |
| SCG — G | 0.37 | 3 |
| SCH — H | 0.61 | 1 |
| SCI — I | 0.25 | 2 |

ONLINE VIDEO DISTRIBUTION SUPPORT METHOD, ONLINE VIDEO DISTRIBUTION SUPPORT APPARATUS AND ONLINE VIDEO DISTRIBUTION SUPPORT SYSTEM

CROSS-REFERENCE TO RELATED APPLICATIONS

This application is based on and claims the benefit of priority of Japanese Patent Application No. 2021-055470 filed on Mar. 29, 2021, the entire contents of which are incorporated herein by reference.

FIELD

The present disclosure relates to an online video distribution support method, an online video distribution support apparatus, and an online video distribution support system.

BACKGROUND

JP-A-2016-114684 discloses an understanding level calculation apparatus that calculates an understanding level of a participant with respect to a slide based on line-of-sight information of the participant participating in a lecture content and based on a line-of-sight movement direction of the participant and a slide direction of the slide before and after slide switching of the lecture content. The understanding level calculation apparatus acquires the line-of-sight information of the participant participating in the lecture content, records the line-of-sight information in a recording unit, and calculates the line-of-sight movement direction before and after switching of the slide using a line-of-sight coordinate included in the line-of-sight information, a measurement time of the line-of-sight coordinate, and a switching time at which the slide of the lecture content is slid and switched. The understanding level calculation apparatus determines the understanding level of the participant with respect to the slide based on a calculated cosine value of an angle formed by the slide direction and the line-of-sight movement direction before the switching of the slide and a calculated cosine value of an angle formed by the slide direction and the line-of-sight movement direction after the switching of the slide.

SUMMARY

Here, there is a demand for a distributor using an online video distribution service such as a video call system to confirm whether a distribution content that the distributor desires to transmit is transmitted to a viewer, whether the viewer is interested in the distribution content, and the like. However, in the video call system, at the time of switching the slide which is the distribution content, it is determined whether the participant thoroughly reads the slide based on the slide direction of the slide and the line-of-sight movement direction of the participant (that is, the viewer). Therefore, it is not possible to determine whether there is a correlation between a content (place) described by the distributor and a content (place) in which the viewer is interested during a period from display of the slide to the switching.

The present disclosure has been made in view of the circumstances in the related art described above, and an object thereof is to provide an online video distribution support method, an online video distribution support apparatus, and an online video distribution support system that calculate a degree of interest of a viewer with respect to a distribution content of a distributor that distributes a live video online and efficiently support improvement of the distribution content by the distributor.

The present disclosure provides an online video distribution support method to be executed by an online video distribution support system, the online video distribution support system including one or more computers connected to communicate with a plurality of viewer terminals used by N (N is an integer equal to or larger than 2) viewers who view an online video, the online video distribution support method including: displaying a video distribution screen including a material designated by a distributor that distributes the online video; acquiring information on a line-of-sight position of each of the viewers on the video distribution screen from each of the viewer terminals; detecting and acquiring a line-of-sight position of the distributor on the video distribution screen by using a captured image obtained by capturing the distributor; and calculating and outputting a degree of interest of each of the viewers based on the line-of-sight position of the corresponding viewer and the line-of-sight position of the distributor.

The present disclosure provides an online video distribution support apparatus including one or more computers, the online video distribution support apparatus including: an acquisition unit configured to acquire information on a line-of-sight position of each of N (N is an integer equal to or greater than 2) viewers viewing an online video; an output unit configured to output a video distribution screen including a material designated by a distributor that distributes the online video; a detection unit configured to detect a line-of-sight position of the distributor on the video distribution screen by using a captured image obtained by capturing the distributor; and a control unit configured to calculate and output a degree of interest of each of the viewers based on the line-of-sight position of the corresponding viewer and the line-of-sight position of the distributor.

The present disclosure provides an online video distribution support system including one or more computers, the online video distribution support system including: a plurality of viewer terminals used by N (N is an integer equal to or greater than 2) viewers viewing an online video; and a distributor terminal connected to communicate with the plurality of viewer terminals and capable of accepting an operation of a distributor that distributes the online video, wherein each of the plurality of viewer terminals is configured to: display a video distribution screen including a material transmitted from the distributor terminal, and detect a line-of-sight position of the corresponding viewer on the video distribution screen by using a captured image obtained by capturing the corresponding viewer viewing the video distribution screen, and transmit the line-of-sight position to the distributor terminal, wherein the distributor terminal is configured to: acquire information on the line-of-sight position of each the viewers transmitted from each of the viewer terminals, display the video distribution screen including the material, detect and acquire a line-of-sight position of the distributor on the video distribution screen by using a captured image obtained by capturing the distributor, and calculate and output a degree of interest of each of the viewers based on the line-of-sight position of the corresponding viewer and the line-of-sight position of the distributor.

According to the present disclosure, it is possible to calculate a degree of interest of a viewer with respect to a distribution content of a distributor that distributes a live video online, and efficiently support improvement of the distribution content by the distributor.

BRIEF DESCRIPTION OF DRAWINGS

FIG. 9 is a diagram showing an example of a display order table of a (k+1)th slide.

FIG. 10 is a diagram showing an example of a display order table of a (k+2)th slide.

DETAILED DESCRIPTION

Hereinafter, embodiments specifically disclosing configurations and operations of an online video distribution support method, an online video distribution support apparatus, and an online video distribution support system according to the present disclosure will be described in detail below with reference to the accompanying drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding for those skilled in the art. The accompanying drawings and the following descriptions are provided for those skilled in the art to have a thorough understanding of the present disclosure, and are not intended to limit a subject matter recited in the claims.

First Embodiment

Figure 1:
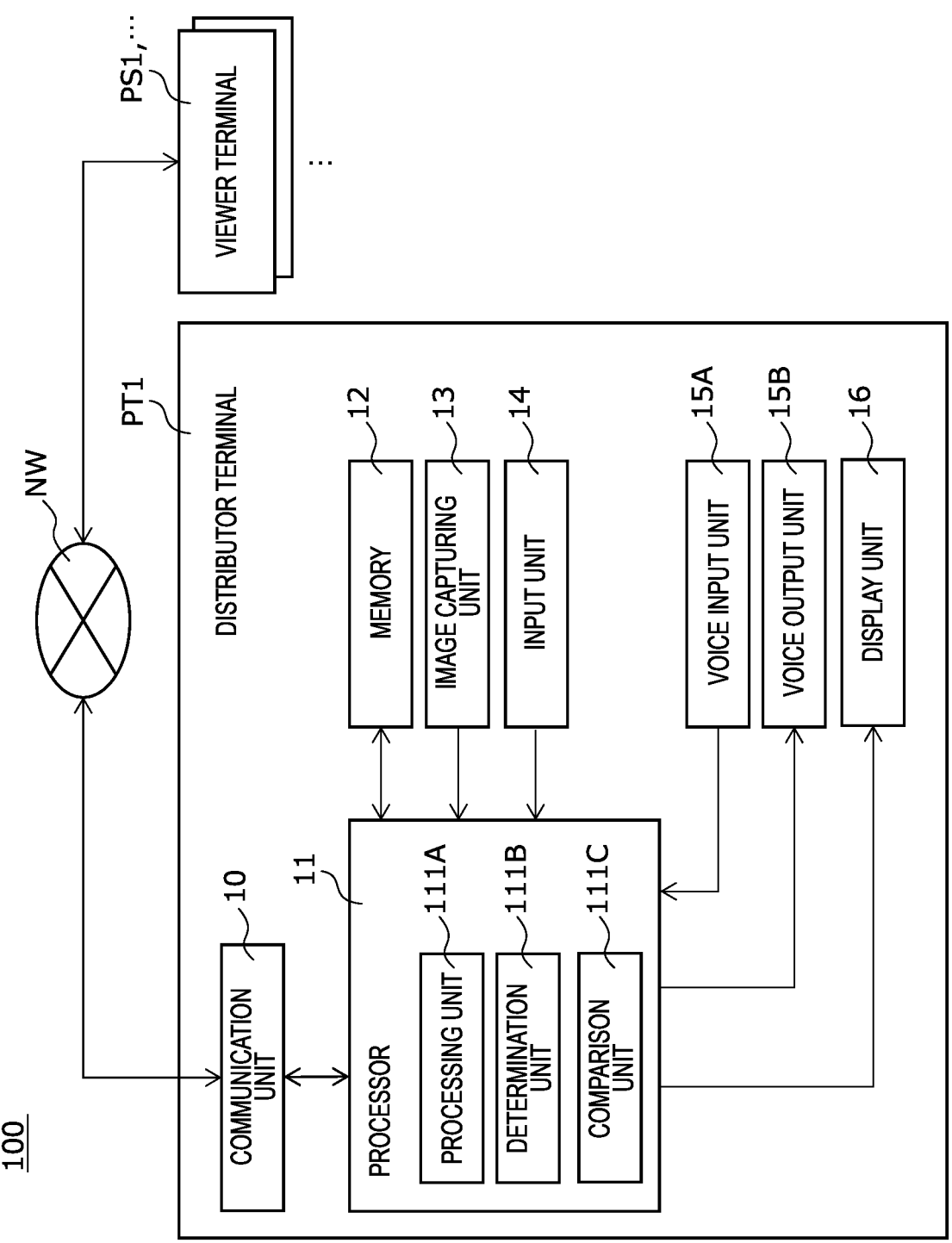
FIG. 1 is a block diagram showing an example of an internal configuration of a distributor terminal in an online video distribution support system according to a first embodiment.

First, an internal configuration of an online video distribution support system 100 according to a first embodiment will be described with reference to FIG. 1. FIG. 1 is a block diagram showing an example of the internal configuration of the online video distribution support system 100 according to the first embodiment. The online video distribution support system 100 shown in FIG. 1 is an example, and the present invention is not limited thereto.

A distributor terminal PT1 as an example of an online video distribution support apparatus is operated by a distributor TC that performs video distribution in online video distribution, and is implemented by, for example, a personal computer (PC), a notebook PC, a tablet terminal, and a smartphone. The distributor terminal PT1 is connected, via a network NW, to each of viewer terminals PS1, . . . used by one or more viewers who view the online video distribution so that the distributor terminal PT1 and the viewer terminals PS1, . . . can wirelessly communicate with each other. Here, the wireless communication is communication via a wireless local area network (LAN) such as Wi-Fi (registered trademark).

The distributor terminal PT1 switches an image (live video) of the viewer displayed on a display unit 16 (hereinafter referred to as a "viewer image") in order to enable the distributor TC to visually confirm a state of each of a plurality of viewers viewing the online video distribution (for example, a state of whether the viewer understands the video distribution content of the online video distribution, and whether there is interest in the distribution content).

The distributor terminal PT1 evaluates, based on a position to which a line of sight of the distributor TC is directed during the online video distribution (hereinafter, referred to as "line-of-sight position") and line-of-sight positions of the plurality of viewers, a degree of interest of each of the plurality of viewers with respect to the distribution content, or evaluates whether there is a correlation between the content (place) described by the distributor TC and the content (place) in which each of the plurality of viewers is interested.

The distributor terminal PT1 includes a communication unit 10, a processor 11, a memory 12, an image capturing unit 13, an input unit 14, a voice input unit 15A, a voice output unit 15B, and the display unit 16. Although not shown in FIG. 1, the distributor terminal PT1 may include two or more display units.

The communication unit 10 as an example of an acquisition unit transmits and receives data to and from each of the plurality of viewer terminals PS1, . . . used by the viewer via the network NW. The communication unit 10 outputs the information on the viewer image (live video) or a line-of-sight position transmitted from each of the viewer terminals PS1, . . . to the processor 11. The communication unit 10 transmits a distributor image captured by the image capturing unit 13 to each of the viewer terminals PS1, . . . , and transmits data or the like displayed on the display unit 16 included in each of the plurality of viewer terminals PS1, . . . used by each viewer based on an operation by the distributor TC received by the input unit 14.

The processor 11 is configured using, for example, a central processing unit (CPU) or a field programmable gate array (FPGA), and performs various processing and control in cooperation with the memory 12. Specifically, the processor 11 refers to a program and data stored in the memory 12, and executes the program to implement functions of units. Here, the units are, for example, a processing unit 111A, a determination unit 111B, and a comparison unit 111C.

The processing unit 111A as an example of a detection unit executes a convolutional neural network (CNN) analysis processing on a captured image (hereinafter, referred to as a "distributor image") in which the distributor TC is captured, which is output from the image capturing unit 13, and calculates a line-of-sight position of the distributor TC. The processing unit 111A outputs the information on the line-of-sight position of the distributor TC, which is a calculation result, and an image captured time of the distributor image used for the calculation of the line-of-sight position to the determination unit 111B in association with each other. A line-of-sight position calculation processing is not limited to the CNN analysis processing, and may be executed using a known technique.

When the determination unit 111B determines that a shared material is switched by a distributor TC operation or every predetermined time (for example, 3 minutes, 5 minutes, or 10 minutes) set in advance, the processing unit 111A refers to the information on the line-of-sight positions of the distributor TC and the plurality of viewers recorded in the memory 12, and generates various kinds of data used for calculation (evaluation) of the degree of interest of each viewer. Here, the various kinds of data are, for example, line-of-sight movement line data, and line-of-sight heat map. Here, the line-of-sight movement line data will be described in detail in a first modification of the first embodiment. The line-of-sight heat map will be described in detail in a second modification of the first embodiment.

The determination unit 111B determines, based on the information on the line-of-sight position of the distributor TC output from the processing unit 111A, whether the distributor TC is viewing an area (hereinafter, referred to as a "shared material display area") in which the shared material or a shared video is displayed on the video distribution screen displayed on the display unit 16. When the determination unit 111B determines that the line-of-sight position of the distributor TC is located in a shared material display area SC11 (see FIG. 3), the determination unit 111B records the line-of-sight position of the distributor TC.

In the following description, an example in which the shared material (that is, image data) is included and displayed in the video distribution screen of each of the distributor terminal PT1 and the plurality of viewer terminals PS1, . . . is described for ease of understanding, whereas the data included and displayed in the video distribution screen is not limited to the image data. For example, the data included and displayed on the video distribution screen may be video data captured by the distributor TC. In such a case, each of the plurality of viewer terminals PS1, . . . displays video data distributed in real time from the distributor terminal PT1 on a video distribution screen.

Here, the shared material will be described. The shared material is data that is shared between the distributor terminal PT1 and each of the plurality of viewer terminals PS1, . . . , and is data that is displayed on the display unit 16 of the distributor terminal PT1 and the display unit 26 of each of the plurality of viewer terminals PS1, . . . during the online video distribution and that can be viewed by the distributor TC and each of the plurality of viewers. For example, the shared material is a slide material including a plurality of pieces of image data for presentation, a material in a portable document format (PDF), live video (moving image) data, recorded video (moving image) data, image data, or the like. The shared material maybe data transmitted from a viewer terminal of any viewer permitted or designated by the distributor TC.

The determination unit 111B records, for each viewer, the information on the line-of-sight position of the viewer acquired from each of the plurality of viewer terminals PS1, . . . and the image captured time of the viewer image used for the calculation of the line-of-sight position in association with each other. Specifically, the determination unit 111B accumulates and records identification information (for example, a name of the viewer, an account name of the viewer, a viewing number of the online video distribution, an Internet protocol (IP) address of the viewer terminal, and a mail address) capable of identifying each viewer in association with the line-of-sight information in the memory 12. Here, the line-of-sight position of the viewer transmitted from each of the plurality of viewer terminals PS1, . . . is a coordinate (position) on a shared material display area SC21 (see FIG. 4) on the video distribution screen displayed on the viewer terminal.

The determination unit 111B determines whether the shared material is switched by the distributor TC operation. Specifically, when the shared material is a slide material, the determination unit 111B determines whether a slide is switched. When the shared material is a material in the PDF format, the determination unit 111B determines whether a page is switched. When the shared material is live video (moving image) data, recorded video (moving image) data, image data, or the like, the determination unit 111B may determine whether there is data switching. When it is determined that the shared material is switched by the distributor TC operation, the determination unit 111B generates a control command for requesting determination of a priority order (hereinafter, referred to as a "display order") of the viewer images of the viewers displayed in a viewer image display area of the video distribution screen including the next shared material (that is, after switching by the distributor TC operation), and outputs the control command to each of the processing unit 111A and the comparison unit 111C.

The determination unit 111B may generate a control command for requesting the determination of the display order every predetermined time (for example, 3 minutes, 5 minutes, and 10 minutes) set in advance and output the control command to the comparison unit 111C. Accordingly, even when the shared material is data such as the live video (moving image) data or the recorded video (moving image) data in which the distributor TC does not perform a long time switching operation, the determination unit 111B can generate a control command based on whether the predetermined time (for example, 1 minute, 3 minutes, 5 minutes, and 10 minutes) set in advance elapses.

The comparison unit 111C as an example of a control unit analyzes the correlation between the line-of-sight position of the distributor TC accumulated and recorded in the memory 12 and the line-of-sight position of each of the plurality of viewers from a timing at which the shared material currently displayed is displayed on the display unit 16 (that is, switched to the shared material currently displayed by the distributor TC operation) to a timing at which the shared material is switched to the next shared material by the distributor TC operation. The determination unit 111B calculates (evaluates) the degree of interest of each viewer with respect to the shared material based on an analysis result. The comparison unit 111C may analyze the correlation between the line-of-sight position of the distributor TC accumulated and recorded in the memory 12 during the predetermined time and the line-of-sight position of each of the plurality of viewers every predetermined time (for example, 1 minute, 3 minutes, and 5 minutes) set in advance.

Based on the analysis result, the comparison unit 111C calculates (evaluates) the degree of interest of each viewer with respect to the shared material displayed in each of the shared material display areas SC11 and SC21 at a timing when the line-of-sight position is measured. A method of calculating the degree of interest will be described later.

The comparison unit 111C records the calculated (evaluated) degree of interest in a display order table (see FIGS. 9 and 10) recorded in the memory 12 for each viewer, and updates the display order of the viewer images of the viewers displayed in the viewer image display area of the video distribution screen including the next shared material (that is, after switching by the distributor TC operation). The comparison unit 111C calculates an average value of the degrees of interest of the plurality of viewers based on the calculated (evaluated) degrees of interest. The comparison unit 111C generates a video distribution screen including viewer bird's-eye view information (see FIG. 3) indicating an index of an approximate degree of interest of each of the plurality of viewers with respect to the shared material based on the information of the calculated average value of the degrees of interest, and outputs the video distribution screen to the display unit 16 to display the video distribution screen.

The method of determining the display order described above may be set by the distributor TC. For example, when the method of determining a plurality of viewer images displayed in the viewer image display area SC12 are set in descending order of the degree of interest of the viewer, the comparison unit 111C determines the display order in descending order of the degree of interest of the viewer recorded in the display order table, and when the method of determining the plurality of viewer images are set in ascending order of the degree of interest of the viewer, the comparison unit 111C determines the display order in ascending order of the degree of interest of the viewer recorded in the display order table.

Based on the control command transmitted from the determination unit 111B, the comparison unit 111C generates the video distribution screen including the viewer images of a predetermined number of viewers (for example, any number such as five, eight, or ten) from the top of the display order based on the display order of each of the plurality of viewers recorded in the display order table, and outputs the video distribution screen to the display unit 16 to cause the display unit 16 to display the video distribution screen.

The comparison unit 111C determines the order of the viewers after rearrangement as the display order of the viewers. The comparison unit 111C determines the viewer images of a predetermined number of viewers from the top of the display order based on the determined display order, generates a video distribution screen including each of the determined viewer images of the predetermined number of viewers, and outputs the video distribution screen to the display unit 16 to display the video distribution screen. Here, the predetermined number of persons is set by the distributor TC and is equal to the number of viewer images that can be displayed in the viewer image display area SC12.

The memory 12 includes a record device including a semiconductor memory such as a random access memory (RAM) and a read only memory (ROM) and a storage device such as a solid state drive (SSD) or a hard disk drive (HDD). The memory 12 stores identification information for identifying all viewers viewing the online video distribution, the display order table, and the like. The memory 12 stores a learning model used in the CNN analysis processing.

The image capturing unit 13 is, for example, a solid-state imaging element of a charged-coupled device (CCD) or a complementary metal oxide semiconductor (CMOS), and converts an optical image formed on an imaging surface into an electric signal. The image capturing unit 13 outputs the captured image captured by the distributor TC to the processing unit 111A in the processor 11.

The input unit 14 is a user interface configured with, for example, a touch panel, a keyboard, or a mouse. The input unit 14 converts a received distributor TC operation into an electric signal (control command) and outputs the electric signal to the processor 11. When the input unit 14 is configured with a touch panel, the input unit 14 maybe configured integrally with the display unit 16.

The voice input unit 15A includes a microphone or the like, converts collected voice (sound) of the distributor TC into an electric signal, and outputs the electric signal to the processor 11. The electric signal output to the processor 11 is transmitted from the communication unit 10 to each of the viewer terminals PS1, . . . via the network NW, and is output from a speaker (not shown) included in each of the viewer terminals PS1, . . . .

The voice output unit 15B includes, for example, a speaker, an earphone, and a headphone, and converts the electric signal based on the voice (sound) of the viewer transmitted from each of the plurality of viewer terminals PS1, . . . into voice (sound) and outputs the voice (sound).

The display unit 16 as an example of an output unit is configured using, for example, a display such as a liquid crystal display (LCD) or an organic electroluminescence (EL). The display unit 16 displays the video distribution screen (see FIG. 2) output from the processor 11.

The network NW connects the distributor terminal PT1 and each of the plurality of viewer terminals PS1, . . . so that the distributor terminal PT1 and each of the plurality of viewer terminals PS1, . . . can perform wired communication or wireless communication.

Each of the plurality of viewer terminals PS1, . . . is operated by a viewer who views an online video distribution, and is implemented by, for example, a PC, a notebook PC, a tablet terminal, or a smartphone. Each of the plurality of viewer terminals PS1, . . . is connected to the distributor terminal PT1 via the network NW so as to be able to wirelessly communicate with the distributor terminal PT1. Here, wireless communication is, for example, communication via a wireless LAN such as Wi-Fi (registered trademark). Each of the plurality of viewer terminals PS1, . . . includes an image capturing unit 23 capable of capturing an image of the viewer, and transmits the captured viewer image (live video), information on the line-of-sight position of the viewer, and the like to the distributor terminal PT1. Each of the plurality of viewer terminals PS1, . . . displays the video distribution screen including the shared material, the distributor image, and the like transmitted from the distributor terminal PT1, or converts the electric signal into voice and outputs the voice from a speaker (not shown).

Figure 2:
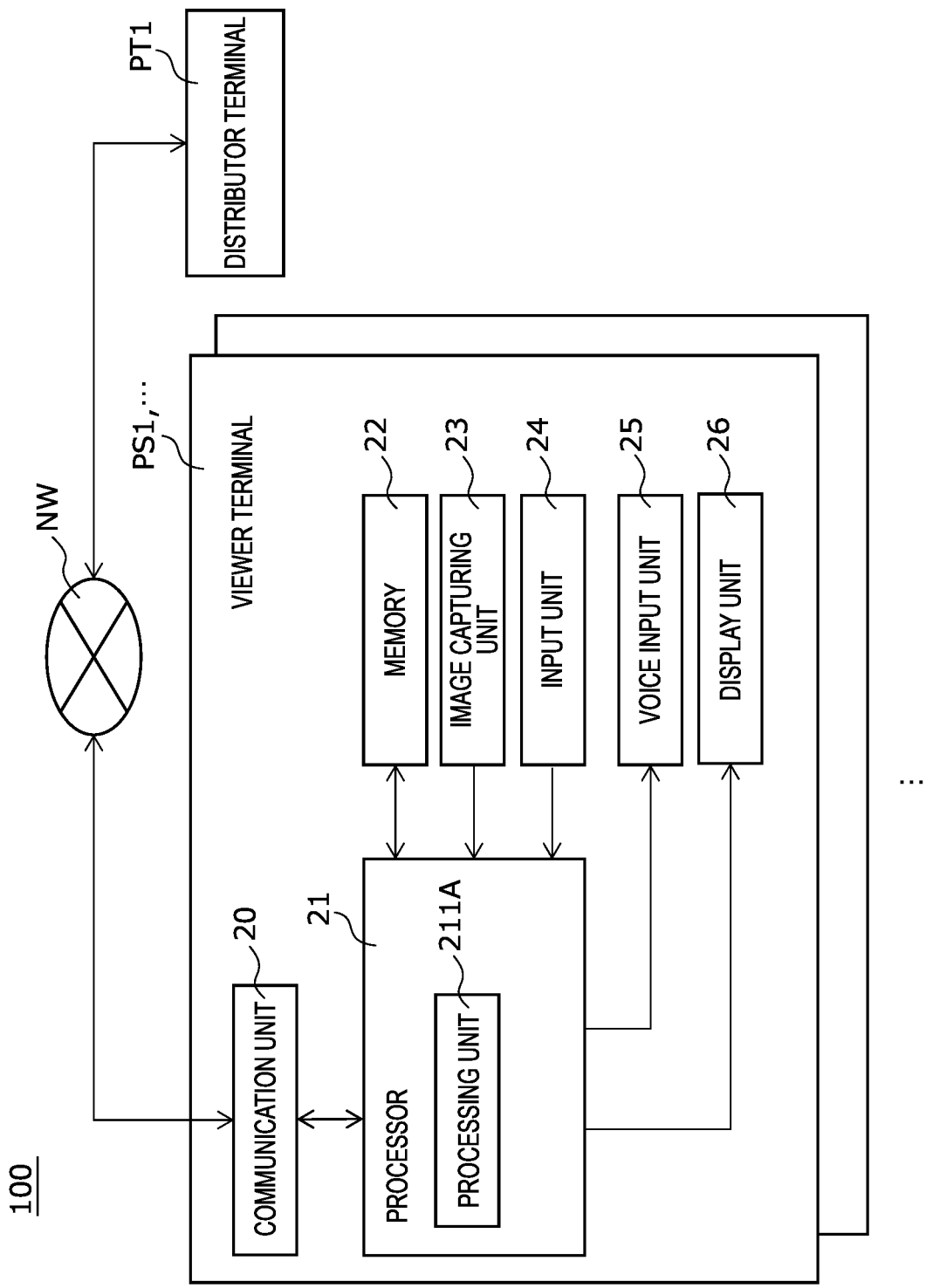
FIG. 2 is a block diagram showing an example of an internal configuration of a viewer terminal in the online video distribution support system according to the first embodiment.

Next, an example of an internal configuration of each of the plurality of viewer terminals PS1, . . . will be described with reference to FIG. 2. FIG. 2 is a block diagram showing an example of the internal configuration of each of the viewer terminals PS1, . . . in the online video distribution support system 100 according to the first embodiment. The viewer terminal PS1 shown in FIG. 2 is an example, and the present invention is not limited thereto. Since the plurality of viewer terminals PS1, . . . have the same configuration, an example of the internal configuration of one viewer terminal PS1 will be described here.

The viewer terminal PS1 includes a communication unit 20, a processor 21, a memory 22, the image capturing unit 23, an input unit 24, a voice output unit 25, and a display unit 26.

The communication unit 20 transmits and receives data to and from the distributor terminal PT1 via the network NW. The communication unit 20 outputs the distributor image (live video) transmitted from the distributor terminal PT1 and the shared material to the processor 21. The communication unit 20 transmits the viewer image captured by the image capturing unit 23 to the distributor terminal PT1, and transmits information on the line-of-sight position of the viewer to the distributor terminal PT1.

The processor 21 is configured by using, for example, a CPU or an FPGA, and cooperates with the memory 22 so as to perform various processing and control. Specifically, the processor 21 refers to a program and data stored in the memory 22, and executes the program to implement functions of units. Here, the units are, for example, a processing unit 211A.

The processing unit 211A executes the CNN analysis processing on the captured image output from the image capturing unit 23, and calculates the line-of-sight position of the viewer in the shared material display area SC21. The processing unit 211A outputs the information on the line-of-sight position of the viewer, which is the calculation result, the image captured time of the viewer image used for the calculation of the line-of-sight position, and identification information assigned to the viewer to the communication unit 20 in association with each other, and causes the communication unit 20 to transmit the information to the distributor terminal PT1. The line-of-sight position calculation processing is not limited to the CNN analysis processing, and may be executed using a known technique.

The memory 22 includes a record device including a semiconductor memory such as a RAM and a ROM and any one of storage devices such as an SSD and an HDD. The memory 22 stores a learning model used for the CNN analysis processing.

The image capturing unit 23 is, for example, a solid-state imaging element such as a CCD or a CMOS, and converts an optical image formed on an imaging surface into an electric signal. The image capturing unit 23 outputs the viewer image captured by the viewer to the processing unit 211A in the processor 21.

The input unit 24 is a user interface configured with, for example, a touch panel, a keyboard, or a mouse. The input unit 24 converts a received viewer operation into an electric signal (control command) and outputs the electric signal to the processor 21. When the input unit 24 is configured using the touch panel, the input unit 24 may be configured integrally with the display unit 26.

The voice output unit 25B includes, for example, a speaker, an earphone, and a headphone, and converts the electric signal based on the voice (sound) of the distributor transmitted from the distributor terminal PT1 into the voice (sound) and outputs the voice (sound).

The display unit 26 is configured with, for example, a display such as an LCD or an organic EL. The display unit 26 displays the video distribution screen (see FIG. 4) output from the processor 21.

Figure 3:
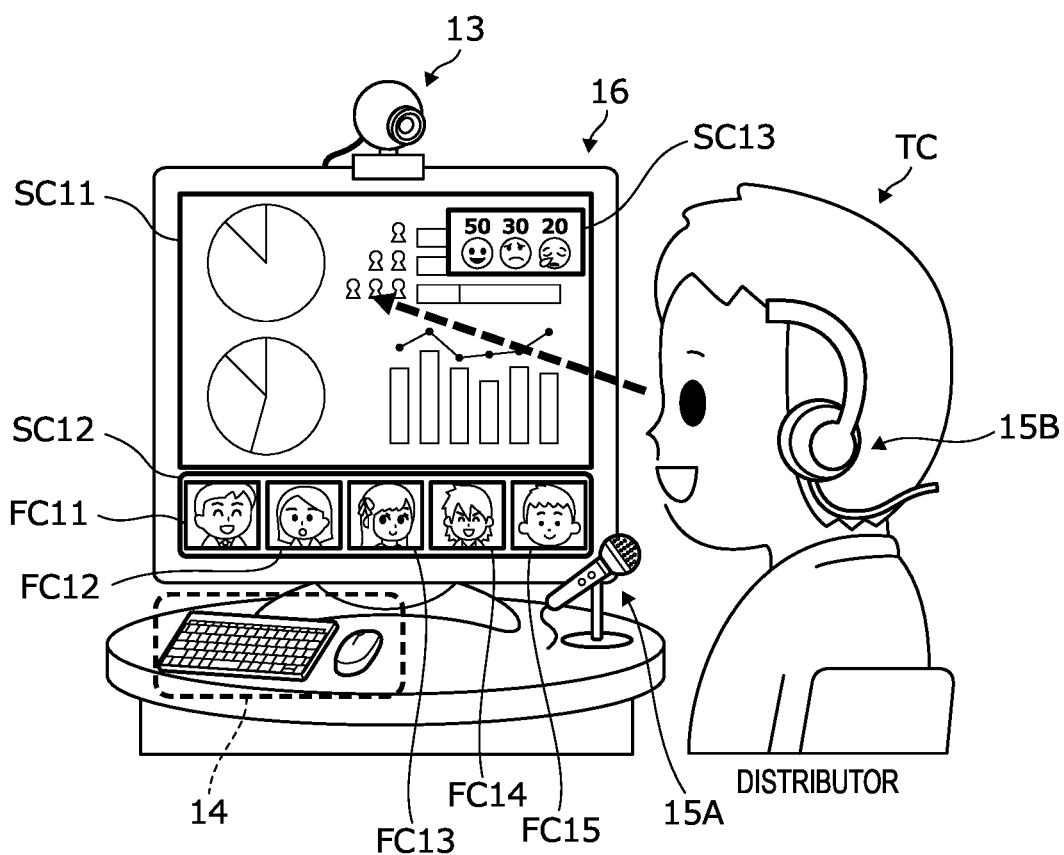
FIG. 3 is a diagram showing a use case example of the distributor terminal and an example of a video distribution screen.

Next, a video distribution screen displayed on the display unit 16 of the distributor terminal PT1 will be described with reference to FIG. 3. FIG. 3 is a diagram showing a use case example of the distributor terminal PT1 and an example of the video distribution screen. A display layout of the video distribution screen shown in FIG. 3 is an example and is not limited thereto.

The image capturing unit 13 shown in the use case example in FIG. 3 is installed at a position where the image capturing unit 13 can capture a face of the distributor TC. It is needless to say that an installation position of the image capturing unit 13 is not limited to a position on the display unit 16 as long as the image capturing unit 13 can capture the face of the distributor TC.

The input unit 14 shown in the use case example in FIG. 3 is implemented by a keyboard and a mouse. The voice input unit 15A is implemented by a microphone. The voice output unit 15B is implemented by a headphone. When the voice output unit 15B is implemented by, for example, a headphone with a microphone, the voice input unit 15A may be configured integrally with the voice output unit 15B.

The display unit 16 shown in the use case example of FIG. 3 displays a video distribution screen including the shared material display area SC11 and the viewer image display area SC12. The shared material for the online video distribution designated by the distributor TC operation is displayed in the shared material display area SC11.

In the viewer image display area SC12, viewer images FC11, FC12, FC13, FC14, and FC15 (live video) of five viewers determined by the determination unit 111B in the processor 11 are displayed. Each of the five viewer images FC11 to FC15 displayed in the viewer image display area SC12 is determined by the determination unit 111B every time the slide of the shared material displayed in the shared material display area SC11 is switched by the distributor TC operation, every predetermined time (for example, 3 minutes, 5 minutes, or 10 minutes) set in advance, or every time an operation of requesting the switching of the viewer image by the distributor TC is received.

A degree-of-interest distribution information display area SC13 displays a degree-of-interest distribution image generated by the comparison unit 111C in the processor 11. The comparison unit 111C classifies each of N (N: an integer of 2 or more) viewers into groups of h (h: an integer of 2 or more) levels based on the degree of interest of each viewer recorded in the display order table (see FIGS. 9 and 10). For example, in the example shown in FIG. 3, the comparison unit 111C classifies, based on the degrees of interest of the viewers recorded in the display order table, groups having three levels including viewers having a degree of interest of "0.6 to 1.0" as "group with a very high degree of interest", viewers having a degree of interest of "0.4 to 0.6" as "group with a high degree of interest", and viewers having a degree of interest of "0.0 to 0.4" as "group with a low degree of interest". A value of h and a range of degrees of interest for classifying the viewers into a group may be set to any value by the distributor TC.

The comparison unit 111C calculates the number of viewers or a ratio of viewers in each group after the classification, and generates an degree-of-interest distribution image in which the calculated number of viewers or the ratio of viewers in each group is displayed on an icon (on an upper side of the paper) corresponding to each of the three groups of the "group with a very high degree of interest", the "group with a high degree of interest", and the "group with a low degree of interest". The comparison unit 111C generates a video distribution screen including the generated degree-of-interest distribution image in the degree-of-interest distribution information display area SC13, and displays the video distribution screen on the display unit 16. In the example shown in FIG. 3, the ratio of viewers classified into the "group having a very high degree of interest" is "50". The ratio of viewers classified into the "group with high degree of interest" is "30". The ratio of viewers classified into the "group with low degree of interest" is "20".

Accordingly, the distributor terminal PT1 visualizes and presents current degrees of interest of viewers to the distributor TC. The distributor TC can confirm at a glance whether each viewer is interested in current distribution contents based on degree-of-interest distribution information displayed in the degree-of-interest distribution information display area SC13.

Figure 4:
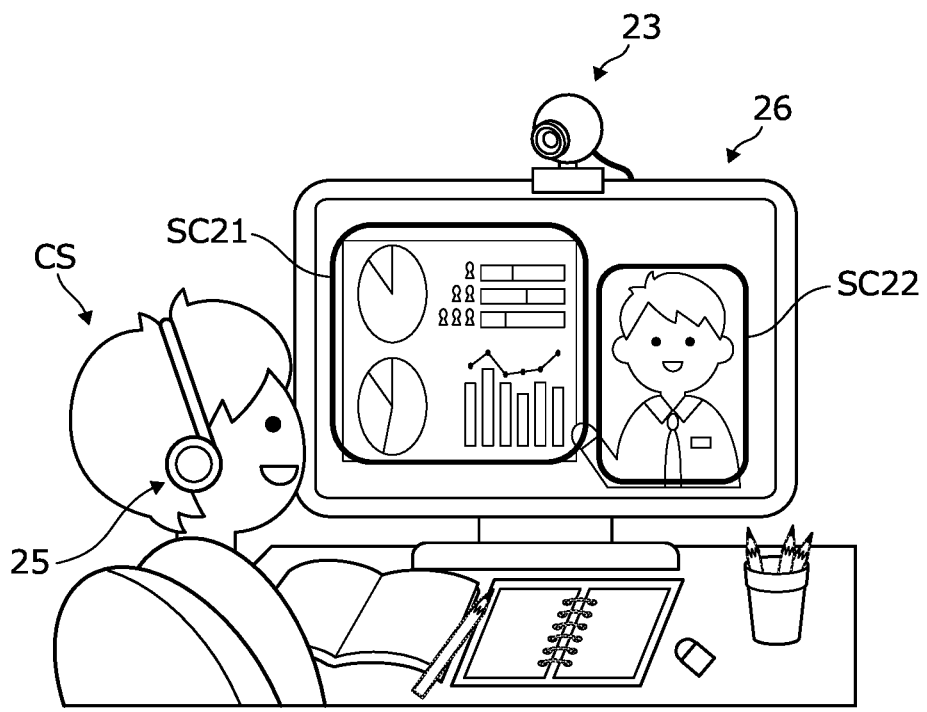
FIG. 4 is a diagram showing a use case example of the viewer terminal and an example of a video distribution screen.

Next, the video distribution screen displayed on the display unit 26 of each of the viewer terminals PS1, . . . will be described with reference to FIG. 4. FIG. 4 is a diagram showing an example of a use case and an example of the video distribution screen of the viewer terminals PS1, . . . . A display layout of the video distribution screen shown in FIG. 4 is an example and is not limited thereto.

The image capturing unit 23 shown in the use case example in FIG. 4 is installed at a position where the image capturing unit 23 can capture a face of the viewer CS. It is needless to say that the installation position of the image capturing unit 23 is not limited to a position on the display unit 26 as long as the image capturing unit 23 can capture the face of the viewer CS.

The input unit 24 shown in the use case example in FIG. 4 is implemented by a keyboard and a mouse. The voice output unit 25 is implemented by a headphone.

The display unit 26 shown in the use case example in FIG. 4 displays a video distribution screen including a shared material display area SC21 and a distributor image display area SC22. The shared material for the online video distribution designated by the distributor TC operation is displayed in the shared material display area SC21. A distributor image transmitted from the distributor terminal PT1 is displayed in the distributor image display area SC22.

Figure 5:
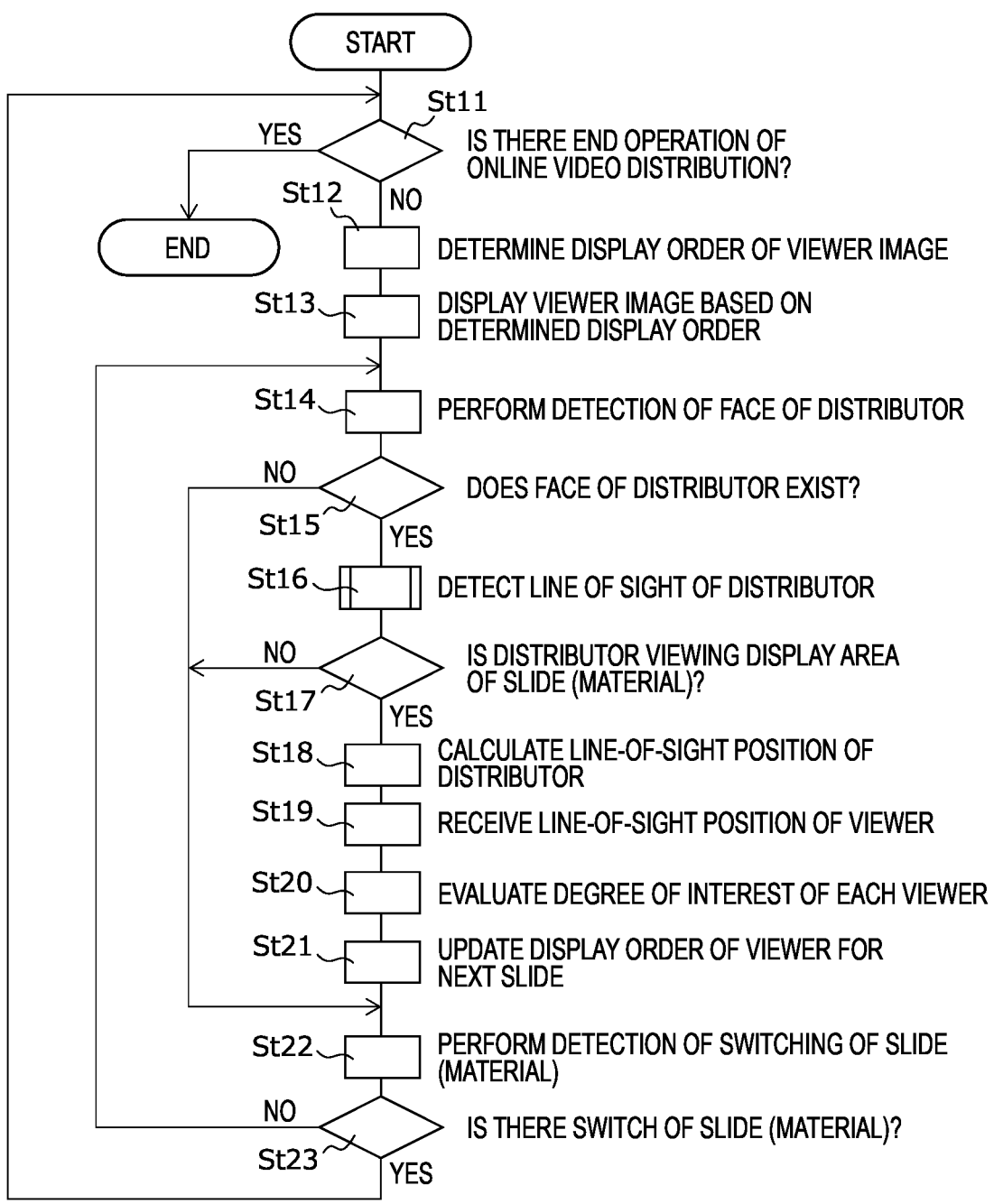
FIG. 5 is a flowchart showing an example of an operation procedure of the distributor terminal according to the first embodiment.
Figure 6:
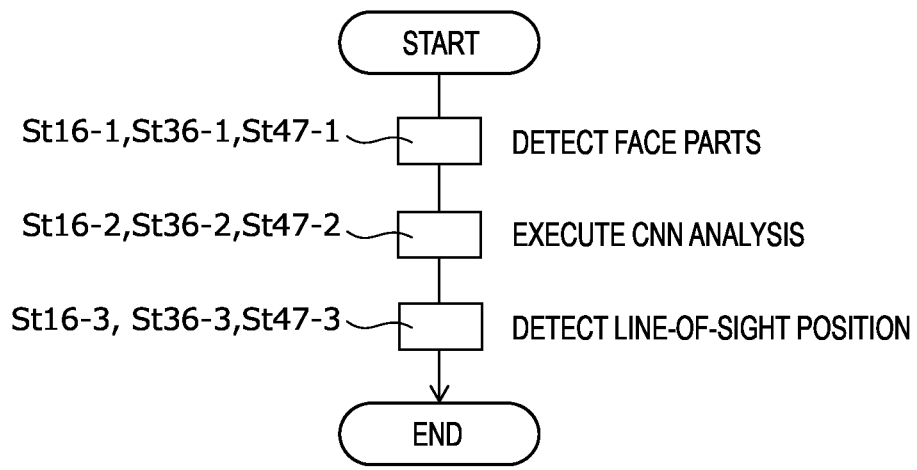
FIG. 6 is a flowchart showing an example of a line-of-sight detection procedure according to the first embodiment.

Here, an operation procedure of the distributor terminal PT1 according to the first embodiment will be described with reference to FIGS. 5 and 6. FIG. 5 is a flowchart showing an example of an operation procedure of the distributor terminal PT1 according to the first embodiment. FIG. 6 is a flowchart showing an example of a line-of-sight detection procedure of the distributor terminal PT1 according to the first embodiment.

In the examples shown in FIGS. 5 and 6, an example in which the viewer images included in the video distribution screen are switched based on the switching of the slide of the shared material will be described, whereas it is needless to say that the switching of the viewer images included in the video distribution screen may be executed at predetermined time intervals set in advance.

The distributor terminal PT1 determines whether there is an end operation of ending the online video distribution by the distributor TC (that is, whether a distribution end operation is received by the input unit 14) (St11). When it is determined in the processing of step St11 that there is an end operation of ending the online video distribution by the distributor TC (St11, YES), the distributor terminal PT1 disconnects the communication with each of the plurality of viewer terminals PS1, . . . and the like, and ends the online video distribution.

On the other hand, when it is determined in the processing of step St11 that there is no end operation of ending the online video distribution by the distributor TC (St11, NO), the distributor terminal PT1 refers to the display order table currently recorded in the memory 12, and determines, based on the display order recorded in the display order table, the display order of the viewers displayed on the video distribution screen (St12).

The distributor terminal PT1 generates, based on the determined display order of the viewers, the video distribution screen (see FIG. 3) including the viewer images of the predetermined number of viewers in the viewer image display area SC12, and displays the video distribution screen on the display unit 16 (St13). The distributor terminal PT1 executes image analysis on the distributor image captured by the image capturing unit 13 to detect the face of the distributor TC (St14), and determines whether the face of the distributor TC is detected from the distributor image based on a detection result (St15).

When it is determined in the processing of step St15 that the face of the distributor TC is detected from the distributor image (St15, YES), the distributor terminal PT1 detects the line of sight of the distributor TC (St16). Specifically, the distributor terminal PT1 detects face parts of the distributor TC from the distributor image (St16-1). The distributor terminal PT1 executes the CNN analysis on an area including both eyes of the distributor TC in the detected face parts (St16-2). The distributor terminal PT1 detects, based on the result of the CNN analysis, the line-of-sight position of the distributor TC indicated by the direction in which the line of sight of the distributor TC is facing (St16-3). The line-of-sight position calculation processing is not limited to the CNN analysis processing, and may be executed using a known technique.

On the other hand, when it is determined in the processing of step St15 that the face of the distributor TC is not detected from the distributor image (St15, NO), the distributor terminal PT1 detects switching of the slide of the shared material displayed in the shared material display area SC11 in the video distribution screen by the distributor TC operation (St22). Here, an example in which the shared material is a slide material constituted by a plurality of pieces of image data for presentation is shown, whereas the shared material is not limited thereto, and may be, for example, a material in a PDF format. When the shared material is a material in the PDF format, the distributor terminal PT1 may detect switching of pages of the shared material.

The distributor terminal PT1 determines, based on the line-of-sight position of the distributor TC detected in the processing of step St16, whether the distributor TC is viewing the slide of the shared material displayed on the video distribution screen (that is, whether the detected line-of-sight position is located in the shared material display area SC11 of the video distribution screen) (St17). When it is determined in the processing of step St17 that the distributor TC is viewing the slide of the shared material displayed on the video distribution screen (St17, YES), the distributor terminal PT1 calculates the line-of-sight position of the detected distributor TC (St18).

On the other hand, when it is determined in the processing of step St17 that the distributor TC is not viewing the slide of the shared material displayed on the video distribution screen (St17, NO), the distributor terminal PT1 proceeds to the processing of step St22, and detects the switching of the slide of the shared material displayed in the shared material display area SC11 in the video distribution screen by the distributor TC operation (St22).

The distributor terminal PT1 receives the information on the line-of-sight position of the viewer transmitted from each of the plurality of viewer terminals PS1, . . . (St19). The distributor terminal PT1 calculates (evaluates), based on the line-of-sight position of the distributor TC and the line-of-sight position of the viewer, the degree of interest of each viewer with respect to the shared material (St20).

The distributor terminal PT1 records the calculated degree of interest of each viewer in the display order table (see FIGS. 9 and 10) recorded in the memory 12, and when the distributor TC performs an operation of displaying the next slide of the shared material, the distributor terminal PT1 updates the display order for determining the viewer image to be displayed in the viewer image display area SC12 of the video distribution screen in which the next slide is displayed in the shared material display area SC11 (St21).

The distributor terminal PT1 performs detection of the switching of the slide of the shared material displayed in the shared material display area SC11 in the video distribution screen by the distributor TC operation (St22).

The distributor terminal PT1 determines whether the slide of the shared material displayed in the shared material display area SC11 in the video distribution screen is switched by the distributor TC operation (St23).

When it is determined in the processing of step St23 that the slide of the shared material displayed in the shared material display area SC11 in the video distribution screen is switched by the distributor TC operation (that is, switching is detected) (St23, YES), the distributor terminal PT1 proceeds to the processing of step St11, and determines whether there is the operation to end the online video distribution by the distributor TC (that is, whether the end operation is received by the input unit 14) (St11).

On the other hand, when it is determined in the processing of step St23 that the slide of the shared material displayed in the shared material display area SC11 in the video distribution screen is not switched (that is, the switching is not detected) by the distributor TC operation (St23, NO), the distributor terminal PT1 proceeds to the processing of step St14, performs the image analysis on the distributor image captured by the image capturing unit 13, and detects the face of the distributor TC (St14).

As described above, the online video distribution support system 100 according to the first embodiment can calculate the degree of interest of each viewer with respect to each distribution content being distributed (that is, the slide of the shared material currently displayed on the video distribution screen). That is, the online video distribution support system 100 according to the first embodiment can efficiently calculate the correlation between the distribution content of the distributor that distributes the live video online and the degree of interest of the viewer who views the live video. The distributor can improve the distribution content based on the calculated degree of interest.

Figure 7:
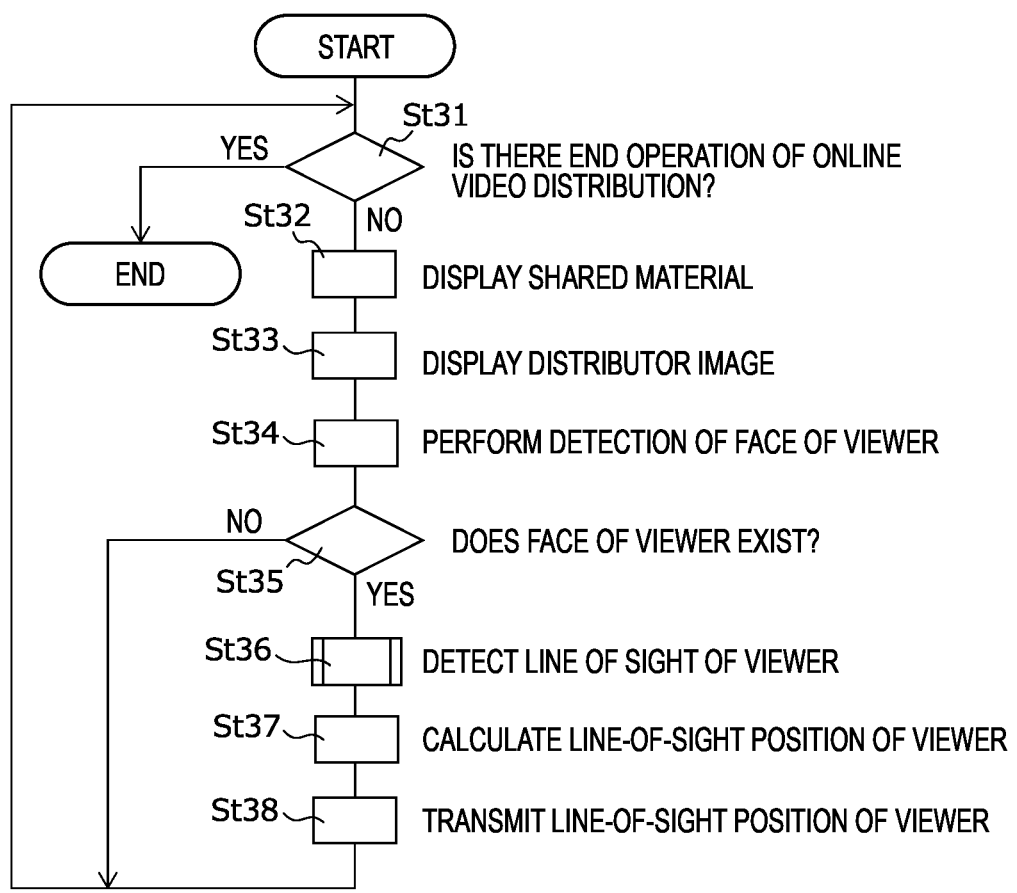
FIG. 7 is a flowchart showing an example of an operation procedure of the viewer terminal according to the first embodiment.

Next, an operation procedure of each of the plurality of viewer terminals PS1, . . . according to the first embodiment will be described with reference to FIGS. 6 and 7. FIG. 7 is a flowchart showing an example of the operation procedure of the viewer terminals PS1, . . . according to the first embodiment.

The viewer terminal PS1 determines whether there is an end operation by the viewer to end the online video distribution (that is, whether a distribution end operation is received by the input unit 24) (St31). When it is determined in the processing of step St31 that there is an end operation of ending the online video distribution by the viewer (St31, YES), the viewer terminal PS1 disconnects the communication with the distributor terminal PT1 and ends the online video distribution.

On the other hand, when it is determined in the processing of step St31 that there is no end operation of ending the online video distribution by the viewer (St31, NO), the viewer terminal PS1 generates a video distribution screen including the shared material (that is, the distributed video data or image data) transmitted from the distributor terminal PT1 in the shared material display area SC21, and displays the video distribution screen on the display unit 26 (St32).

The viewer terminal PS1 generates a video distribution screen including the distributor image display area SC22 based on the distributor image transmitted from the distributor terminal PT1, and displays the video distribution screen on the display unit 26 (St33).

The viewer terminal PS1 performs the image analysis on the viewer image captured by the image capturing unit 23 to detect the face of the viewer (St34), and determines whether the face of the viewer is detected from the viewer image based on the detection result (St35).

When it is determined in the processing of step St35 that the face of the viewer is detected from the viewer image (St35, YES), the viewer terminal PS1 detects the line of sight of the viewer (St36). Specifically, the viewer terminal PS1 detects the face parts of the viewer from the viewer image (St36-1). The viewer terminal PS1 executes the CNN analysis on an area including both eyes of the viewer in the detected face parts (St36-2). The viewer terminal PS1 detects, based on the result of the CNN analysis, the line-of-sight position of the viewer indicated by the direction in which the line of sight of the viewer is directed (St36-3). The line-of-sight position calculation processing is not limited to the CNN analysis processing, and may be executed using a known technique.

On the other hand, when it is determined in the processing of step St35 that the face of the viewer is detected from the viewer image (St35, NO), the viewer terminal PS1 proceeds to the processing of step St31, and determines whether there is an end operation of ending the online video distribution by the viewer (that is, whether the end operation is received by the input unit 24) (St31).

The viewer terminal PS1 calculates the line-of-sight position of the detected viewer in the processing of step St36 (St37). The viewer terminal PS1 transmits information on the calculated line-of-sight position of the viewer to the distributor terminal PT1 (St38).

As described above, each of the plurality of viewer terminals PS1, . . . according to the first embodiment can detect the line-of-sight position of the viewer and transmit the information on the line-of-sight position to the distributor terminal PT1.

(Method of Calculating Degree of Interest in First Embodiment) Here, the calculation (evaluation) processing of the degree of interest in the first embodiment will be described.

The comparison unit 111C calculates (evaluates) the degree of interest for each viewer by referring to the information on the line-of-sight position of the distributor TC and the information on the line-of-sight position of the viewer accumulated in the memory 12, the information being detected during the period in which a k-th slide of the shared material is displayed at a timing when the k-th slide (k: an integer of 1 or more) of the shared material displayed on the video distribution screen is switched to the (k+1)th slide.

The degree of interest in the first embodiment is calculated (evaluated) using similarity calculated based on a distance between the line-of-sight position of the distributor TC and the line-of-sight position of the viewer. The degree of interest in the first embodiment is calculated using the Equation 1 and the Equation 2 shown below.

(Equation 1)
$$dist(P_1, Q_1) = D_1 \quad (1)$$

(Equation 2)
$$\sigma(D_1) = 1 - \frac{1}{1 + e^{-\frac{D_1}{50}+3}} \quad (2)$$

Each of the Equation 1 and the Equation 2 will be described. The Equation 1 is an equation for calculating a distance $D_1$ (that is, a difference in coordinates) between a line-of-sight position $P_1$ (coordinates) of the distributor TC and a line-of-sight position $Q_1$ (coordinates) of the viewer. The Equation 2 is an equation that normalizes the distance $D_1$ calculated by the Equation 1 to calculate the similarity between the line-of-sight position $P_1$ of the distributor TC and the line-of-sight position $Q_1$ of the viewer.

The comparison unit 111C refers to the information on the line-of-sight position of the distributor TC and the information on the line-of-sight position of the viewer accumulated in the memory 12 during the period in which the k-th shared material is displayed. The comparison unit 111C calculates, based on the information on the line-of-sight position of the distributor TC, a total time in which the distributor TC directs the line of sight for each line-of-sight position, and extracts the line-of-sight position $P_1$ having a longest calculated total time. Similarly, the comparison unit 111C calculates, based on the information on the line-of-sight position of the viewer, a total time in which the viewer directs the line of sight for each line-of-sight position, and extracts the line-of-sight position $Q_1$ having the longest calculated total time.

The comparison unit 111C calculates the distance $D_1$ between the extracted line-of-sight position $P_1$ of the distributor TC and the line-of-sight position $Q_1$ of the viewer using the Equation 1. The comparison unit 111C normalizes the calculated distance $D_1$ using the Equation 2. The comparison unit 111C records a normalized value (similarity) as the degree of interest of the viewer in the display order table (see FIGS. 9 and 10) of the memory 12. Here, the degree of interest may be evaluated by a value of 0 to 100 instead of a value of 0 to 1.

As described above, even when the sizes of the video distribution screens displayed on the distributor terminal PT1 and the plurality of viewer terminals PS1, . . . are different from each other, the distributor terminal PT1 can calculate (evaluate) the degree of interest of each of all the viewer terminals PS1, . . . based on the distance $D_1$ between the line-of-sight position $P_1$ of the distributor and the line-of-sight position $Q_1$ of the viewer by normalizing the distance $D_1$ calculated by the Equation 1 using the Equation 2.

Figure 8:
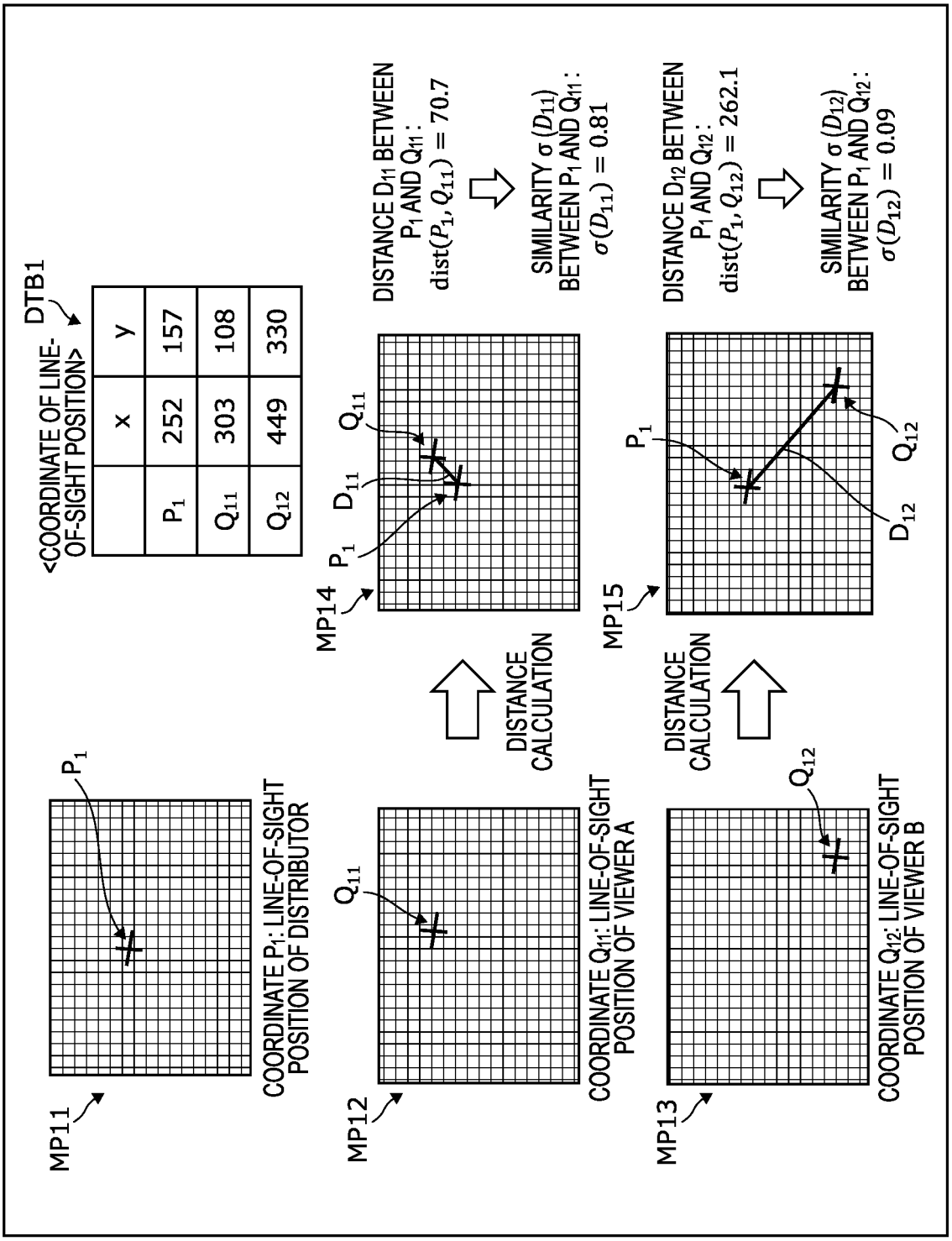
FIG. 8 is a diagram showing an example of calculation of a degree of interest of a viewer according to the first embodiment.

The calculation (evaluation) processing of the degree of interest according to the first embodiment will be described with reference to FIG. 8. FIG. 8 is a diagram showing an example of calculation of the degree of interest of the viewer according to the first embodiment. In FIG. 8, an example of calculating the degree of interest of each of two viewers "viewer A" and "viewer B" shown in a display order table TB1 shown in FIG. 9 will be described using a specific example.

In the example shown in FIG. 8, the comparison unit 111C extracts the line-of-sight position $P_1$ (252, 157) of the distributor TC, the line-of-sight position $Q_{11}$ (303, 108) of the "viewer A", and the line-of-sight position $Q_{12}$ (449, 330) of the "viewer B", which are detected and accumulated while the k-th slide is displayed.

The table DTB1 indicates coordinates of the line-of-sight positions extracted by the comparison unit 111C. A line-of-sight position map MP11 indicates the line-of-sight position $P_1$ (252, 157) of the distributor TC on the video distribution screen. A line-of-sight position map MP12 indicates the sight line position $Q_{11}$ (303, 108) of the "viewer A" on the video distribution screen. A line-of-sight position map MP13 indicates the sight line position $Q_{12}$ (449, 330) of the "viewer B" on the video distribution screen.

First, an example of calculation of the degree of interest of the "viewer A" will be described. The comparison unit 111C calculates the distance $D_{11}$ between the extracted line-of-sight position $P_1$ (252,157) of the distributor TC and the line-of-sight position $Q_{11}$ (303,108) of the "viewer A" using the Equation 1. Further, the comparison unit 111C normalizes the calculated distance $D_{11}$=70.7 by using the Equation 2, and calculates the similarity $\sigma$ ($D_{11}$) between the line-of-sight position $P_1$ (252, 157) of the distributor TC and the line-of-sight position $Q_{11}$ (303, 108) of the "viewer A". Based on the calculated similarity $\sigma$ ($D_{11}$)=0.81, the comparison unit 111C calculates (evaluates) that the degree of interest of the "viewer A" in the k-th slide of the shared material is 0.81, and records the calculated degree of interest in the display order table TB1 (see FIGS. 9 and 10) of the memory 12.

Similarly, an example of calculation of the degree of interest of the "viewer B" will be described. The comparison unit 111C calculates the distance $D_{12}$ between the extracted line-of-sight position $P_1$ (252,157) of the distributor TC and the line-of-sight position $Q_{12}$ (449,330) of the "viewer B" using the Equation 1. Further, the comparison unit 111C normalizes the calculated distance $D_{12}$=262.1 by using the Equation 2, and calculates the similarity $\sigma$ ($D_{12}$) between the line-of-sight position $P_1$ (252, 157) of the distributor TC and the line-of-sight position $Q_{12}$ (449, 330) of the "viewer A". Based on the calculated similarity $\sigma$ ($D_{12}$)=0.09, the comparison unit 111C calculates (evaluates) that the degree of interest in the k-th slide of the shared material by the "viewer B" is 0.09, and records the degree of interest in the display order table TB1 (see FIGS. 9 and 10) of the memory 12.

Figure 11:
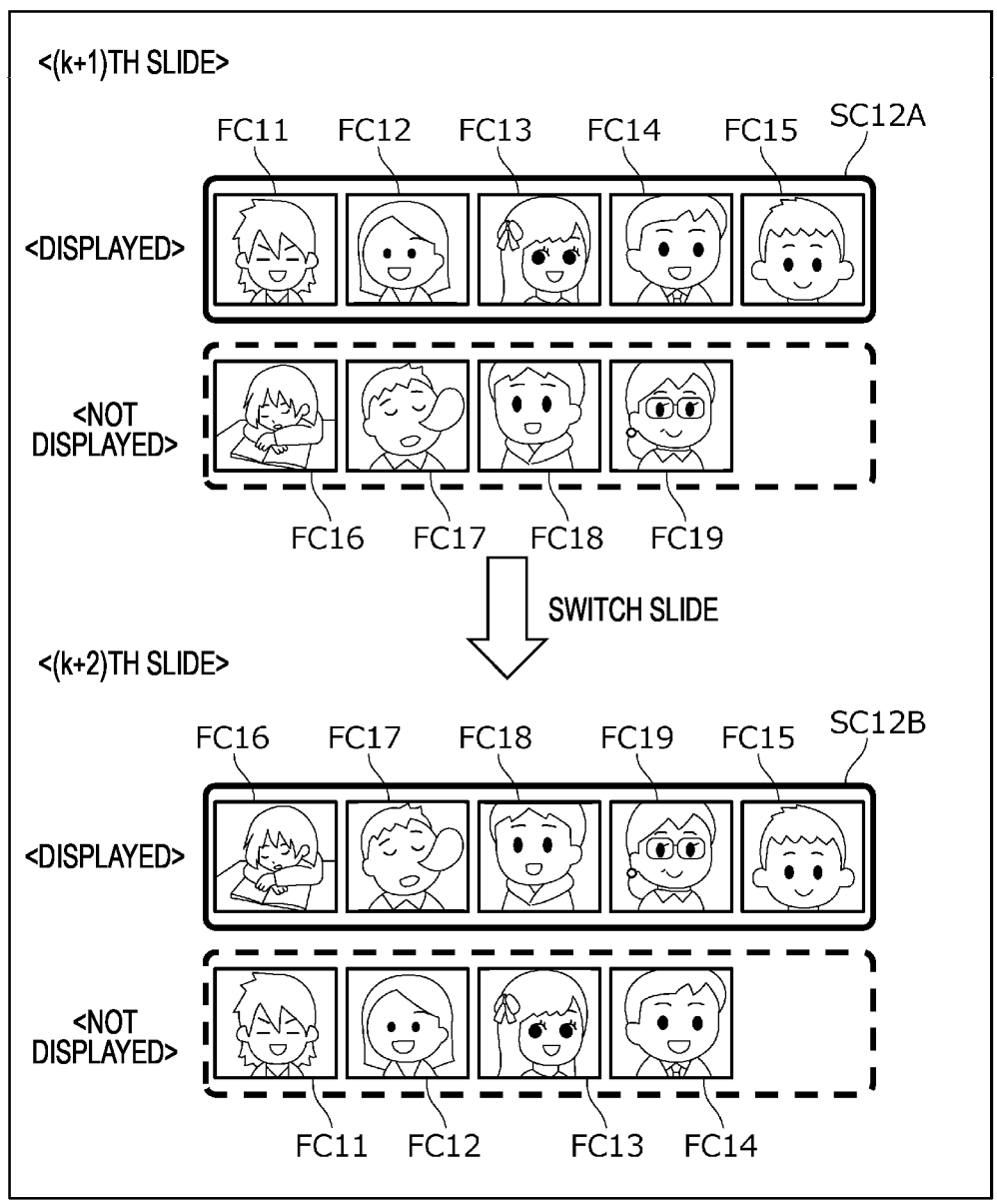
FIG. 11 is a diagram showing an example of display switching of a viewer image.

Next, a switching procedure of the viewer images displayed in the viewer image display area SC12 of the video distribution screen will be described with reference to FIGS. 9 to 11. FIG. 9 is a diagram showing an example of the display order table TB1 of a (k+1)th slide. FIG. 10 is a diagram showing an example of the display order table TB2 of a (k+2)th slide. FIG. 11 is a diagram showing an example of display switching of the viewer images according to the first embodiment.

In the examples shown in FIGS. 9 to 11, an example in which the viewer images included in the video distribution screen are switched based on the switching of the slide of the shared material will be described, whereas it is needless to say that the switching of the viewer images included in the video distribution screen may be executed at predetermined time intervals set in advance.

The display order table TB1 shown in FIG. 9 is a display order table recorded in the memory 12 at a timing at which the slide is switched to the (k+1)th slide by the distributor TC operation. The display order table TB2 is a display order table recorded in the memory 12 at a timing at which the slide is switched to the (k+2)th slide by the distributor TC operation.

In each of the display order table TB1 shown in FIG. 9 and the display order table TB2 shown in FIG. 10, an example is shown in which the identification information of the viewer and the face image of the viewer registered in advance are associated with each other in order to make it easy to understand the description of the switching of the display of the viewer image on the video distribution screen at the time of switching from the (k+1)th slide to the (k+2)th slide shown in FIG. 11, whereas the face image of the viewer is not essential.

Each of the display order tables TB1 and TB2 is recorded (updated) by the comparison unit 111C and recorded in the memory 12. The display order table TB1 records the identification information of the viewer (for example, a name of the viewer, a viewer number, a viewer number of online video distribution, an Internet protocol (IP) address of the viewer terminal, and a mail address), the degree of interest, and the display order in association with each other for each viewer.

For example, the display order table TB1 shown in FIG. 9 records the degree of interest of each of nine viewers viewing the online video distribution. At a timing at which the slide is switched from the k-th slide to the (k+1)th slide by the distributor TC operation, the degree of interest and the display order are calculated (evaluated) by the comparison unit 111C. The display order table TB1 records the degree of interest of each viewer calculated (evaluated) by the comparison unit 111C and the display order in association with each other. The name of the viewer shown in FIG. 9 is an example of the identification information of the viewer.

The "viewer A" corresponding to a face image SCA has a degree of interest of "0.28" and a display order of "4". The "viewer B" corresponding to a face image SCB has a degree of interest of "0.13" and a display order of "2". The "viewer C" corresponding to a face image SCC has a degree of interest of "0.21" and a display order of "3". The "viewer D" corresponding to a face image SCD has a degree of interest of "0.09" and a display order of "1". The "viewer E" corresponding to a face image SCE has a degree of interest of "0.62" and a display order of "5". The "viewer F" corresponding to a face image SCF has a degree of interest of "0.82" and a display order of "9". The "viewer G" corresponding to a face image SCG has a degree of interest of "0.81" and a display order of "8". The "viewer H" corresponding to a face image SCH has a degree of interest of "0.69" and a display order of "6". The "viewer I" corresponding to a face image SCI has a degree of interest of "0.79" and a display order of "7".

The comparison unit 111C determines a viewer image to be displayed in the viewer image display area SC12 of the display unit 16 based on the display order table TB1 shown in FIG. 9. In the example shown in FIG. 11, the number of viewer images displayed in the viewer image display area SC12 is five. In such a case, the comparison unit 111C determines the viewer images of the "viewer D", the "viewer B", the "viewer C", the "viewer A", and the "viewer E" up to the fifth highest display order among the nine viewers as the viewer images to be displayed in the viewer image display area SC12.

The comparison unit 111C generates a video distribution screen including a viewer image display area SC12A (see FIG. 11) in which the viewer images of the five viewers having the determined display order (here, the viewer image FC11 of "viewer D", the viewer image FC12 of "viewer B", the viewer image FC13 of "viewer C", the viewer image FC14 of "viewer A", and the viewer image FC15 of "viewer E") are displayed, and causes the display unit 16 to display the video distribution screen. The viewer image FC16 of "viewer H", the viewer image FC17 of "viewer I", the viewer image FC18 of "viewer G", and the viewer image FC19 of "viewer F" are not included in the viewer image display area SC12A, and are not displayed on the video distribution screen on which the (k+1)th slide is displayed.

While the (k+1)th slide is displayed in the shared material display area, the comparison unit 111C continues to display the viewer image display area SC12A in which the viewer image FC11 of the "viewer D", the viewer image FC12 of the "viewer B", the viewer image FC13 of the "viewer C", the viewer image FC14 of the "viewer A", and the viewer image FC15 of the "viewer E" are displayed, and updates the display order table TB1 based on the line-of-sight position of the distributor TC.

The display order table TB2 shown in FIG. 10 is a display order table recorded in the memory 12 at a timing at which the slide is switched to the (k+2)th slide by the distributor TC operation.

For example, the display order table TB2 shown in FIG. 10 records the degree of interest of each of nine viewers viewing the online video distribution. At a timing at which the slide is switched from the (k+1)th slide to the (k+2)th slide by the distributor TC operation, the degree of interest and the display order are calculated (evaluated) by the comparison unit 111C. The display order table TB2 records the degree of interest of each viewer calculated (evaluated) by the comparison unit 111C and the display order in association with each other. The name of the viewer shown in FIG. 10 is an example of the identification information of the viewer.

The "viewer A" corresponding to a face image SCA has a degree of interest of "0.69" and a display order of "7". The "viewer B" corresponding to a face image SCB has a degree of interest of "0.64" and a display order of "6". The "viewer C" corresponding to a face image SCC has a degree of interest of "0.86" and a display order of "8". The "viewer D" corresponding to a face image SCD has a degree of interest of "0.93" and a display order of "9". The "viewer E" corresponding to a face image SCE has a degree of interest of "0.55" and a display order of "5". The "viewer F" corresponding to a face image SCF has a degree of interest of "0.53" and a display order of "4". The "viewer G" corresponding to a face image SCG has a degree of interest of "0.37" and a display order of "3". The "viewer H" corresponding to a face image SCH has a degree of interest of "0.16" and a display order of "1". The "viewer I" corresponding to a face image SCI has a degree of interest of "0.25" and a display order of "2".

The comparison unit 111C determines a viewer image to be displayed in the viewer image display area SC12 of the display unit 16 based on the display order table TB2 shown in FIG. 10. In the example shown in FIG. 11, the number of viewer images displayed in the viewer image display area SC12 is five. In such a case, the comparison unit 111C determines the viewer images of the "viewer H", the "viewer I", the "viewer G", the "viewer F", and the "viewer E" up to the fifth highest display order among the nine viewers as the viewer images to be displayed in the viewer image display area SC12.

The comparison unit 111C generates a video distribution screen including a viewer image display area SC12B (see FIG. 11) in which the viewer images of the five viewers having the determined display order (here, the viewer image FC16 of "viewer H", the viewer image FC17 of "viewer I", the viewer image FC18 of "viewer G", the viewer image FC19 of "viewer F", and the viewer image FC15 of "viewer E") are displayed, and causes the display unit 16 to display the video distribution screen. The viewer image FC11 of "viewer D", the viewer image FC12 of "viewer B", the viewer image FC13 of "viewer C", and the viewer image FC14 of "viewer A" are not included in the viewer image display area SC12B, and are not displayed on the video distribution screen on which the (k+2)th slide is displayed.

While the (k+2)th slide is displayed in the shared material display area, the comparison unit 111C continues to display the viewer image display area SC12B in which the viewer image FC16 of the "viewer H", the viewer image FC17 of the "viewer I", the viewer image FC18 of the "viewer G", the viewer image FC19 of the "viewer F", and the viewer image FC15 of the "viewer E" are displayed, and updates the display order table TB2 based on the line-of-sight position of the distributor TC.

First Modification of First Embodiment

The online video distribution support system 100 according to the first embodiment described above calculates (evaluates) the degree of interest of the viewer based on the distance $D_1$ between the line-of-sight position $P_1$ of the distributor and the line-of-sight position $Q_1$ of the viewer. An example in which the online video distribution support system 100 according to the first modification of the first embodiment calculates (evaluates) the degree of interest of the viewer based on the correlation (similarity) between line-of-sight movement line data $Z_P$ of the distributor and line-of-sight movement line data $Z_Q$ of the viewer will be described. Here, the line-of-sight movement line data is data indicating a time-series change of the line-of-sight position.

(Method of Calculating Degree of Interest in First Modification of First Embodiment)

Here, calculation (evaluation) processing of the degree of interest in the first modification of the first embodiment will be described.

When the determination unit 111B detects switching from the k-th slide of the shared material displayed on the video distribution screen to the (k+1)th slide, the processing unit 111A refers to the information on the line-of-sight position of the distributor TC and the information on the line-of-sight position of the viewer which are detected while the k-th slide of the shared material is displayed and accumulated in the memory 12. The comparison unit 111C rearranges the line-of-sight positions of the distributor TC in time-series order based on an image captured time associated with the information on the line-of-sight position, and generates the line-of-sight movement line data $Z_P$ (an example of first line-of-sight movement line data) of the distributor TC. Similarly, the processing unit 111A rearranges the line-of-sight positions of the viewers in the time-series order based on the image captured time associated with the information on the line-of-sight position, and generates the line-of-sight movement line data $Z_Q$ (an example of second line-of-sight movement line data) of the viewers for each viewer.

The comparison unit 111C calculates (evaluates) the degree of interest for each viewer using the generated line-of-sight movement line data $Z_P$ of the distributor TC and the generated line-of-sight movement line data $Z_Q$ of the viewer. The degree of interest in the first modification of the first embodiment is calculated using the Equation 3, the Equation 4, and the Equation 5 shown below.

(Equation 3)
$$dist(P_i, Q_i) = \sqrt{(x_{P_i} - x_{Q_i})^2 + (y_{P_i} - y_{Q_i})^2} = V_i \quad (3)$$

(Equation 4)
$$diff(Z_P, Z_Q) = \frac{1}{J}\sum_{i=1}^{J} V_i^2 = V_{Ave} \quad (4)$$

(Equation 5)
$$\sigma(V_{Ave}) = 1 - \frac{1}{1 + e^{-\frac{V_{Ave}}{50} + 5}} \quad (5)$$

Each of the Equation 3 to the Equation 5 will be described. The Equation 3 is an equation for calculating a distance $V_i$ between a line-of-sight position $P_i$ ($x_{P_i}$, $y_{P_i}$) at a predetermined time $t_i$ (i:i=1, 2, ..., J) of the line-of-sight movement line data $Z_P$ of the distributor TC and a line-of-sight position $Q_i$ ($x_{Q_i}$, $y_{Q_i}$) at a predetermined time $t_i$ of the line-of-sight movement line data $Z_Q$ of the viewer. The Equation 4 is an equation for calculating an average distance $V_{Ave}$ of the distances $V_i$ to $V_J$ at J places at each of the predetermined times $t_i$ to $t_J$ (J is an integer equal to or greater than 2) calculated by the Equation 3. The Equation 5 is an equation that normalizes the average distance $V_{Ave}$ calculated by the Equation 4 to calculate a correlation (similarity) between the line-of-sight movement line data $Z_P$ of the distributor TC and the line-of-sight movement line data $Z_Q$ of the viewer.

Here, the predetermined time $t_i$ may be a time corresponding to a sampling rate of the image capturing unit 13 (for example, 10 to 30 fps (frames per second)), or may be a time set in advance by the distributor TC (for example, every 0.5 seconds, or every 1 second).

The processing unit 111A refers to the information on the line-of-sight position of the distributor TC and the information on the line-of-sight position of the viewer accumulated in the memory 12 during the period in which the k-th shared material is displayed, and generates the line-of-sight movement line data $Z_P$ of the distributor TC and the line-of-sight movement line data $Z_Q$ of the viewer. The comparison unit 111C extracts the line-of-sight position (coordinates) of the distributor TC and the line-of-sight position (coordinates) of the viewer at each of the places J at the predetermined times $t_i$ to $t_J$ by using the generated line-of-sight movement line data $Z_P$ of the distributor TC and the line-of-sight movement line data $Z_Q$ of the viewer.

The comparison unit 111C calculates, using the Equation 3, the distance between the line-of-sight position of the distributor TC at the J place extracted at each predetermined time and the line-of-sight position of the viewer. The comparison unit 111C calculates, using the Equation 4, an average value of the calculated distances of the J places (that is, the average distance $V_{Ave}$ between the line-of-sight movement line data $Z_P$ of the distributor TC and the line-of-sight movement line data $Z_Q$ of the viewer). The comparison unit 111C normalizes, using the Equation 5, the average distance $V_{Ave}$ between the calculated line-of-sight movement line data $Z_P$ of the distributor TC and the calculated line-of-sight movement line data $Z_Q$ of the viewer. The comparison unit 111C records, as the degree of interest of the viewer, the normalized similarity (that is, the similarity $\sigma$ ($V_{Ave}$)) in the display order table (see FIGS. 9 and 10) of the memory 12. Here, the degree of interest may be evaluated by a value of 0 to 100 instead of a value of 0 to 1.

As described above, even when the sizes of the video distribution screens displayed on the distributor terminal PT1 and the plurality of viewer terminals PS1, . . . are different from each other, the distributor terminal PT1 can calculate (evaluate) the degree of interest of each of all the viewer terminals PS1, . . . based on the average distance $V_{Ave}$ between the line-of-sight position $P_i$ of the distributor and the line-of-sight position $Q_i$ of the viewer by normalizing the average distance $V_{Ave}$ calculated by the Equation 4 using the Equation 5.

Figure 12:
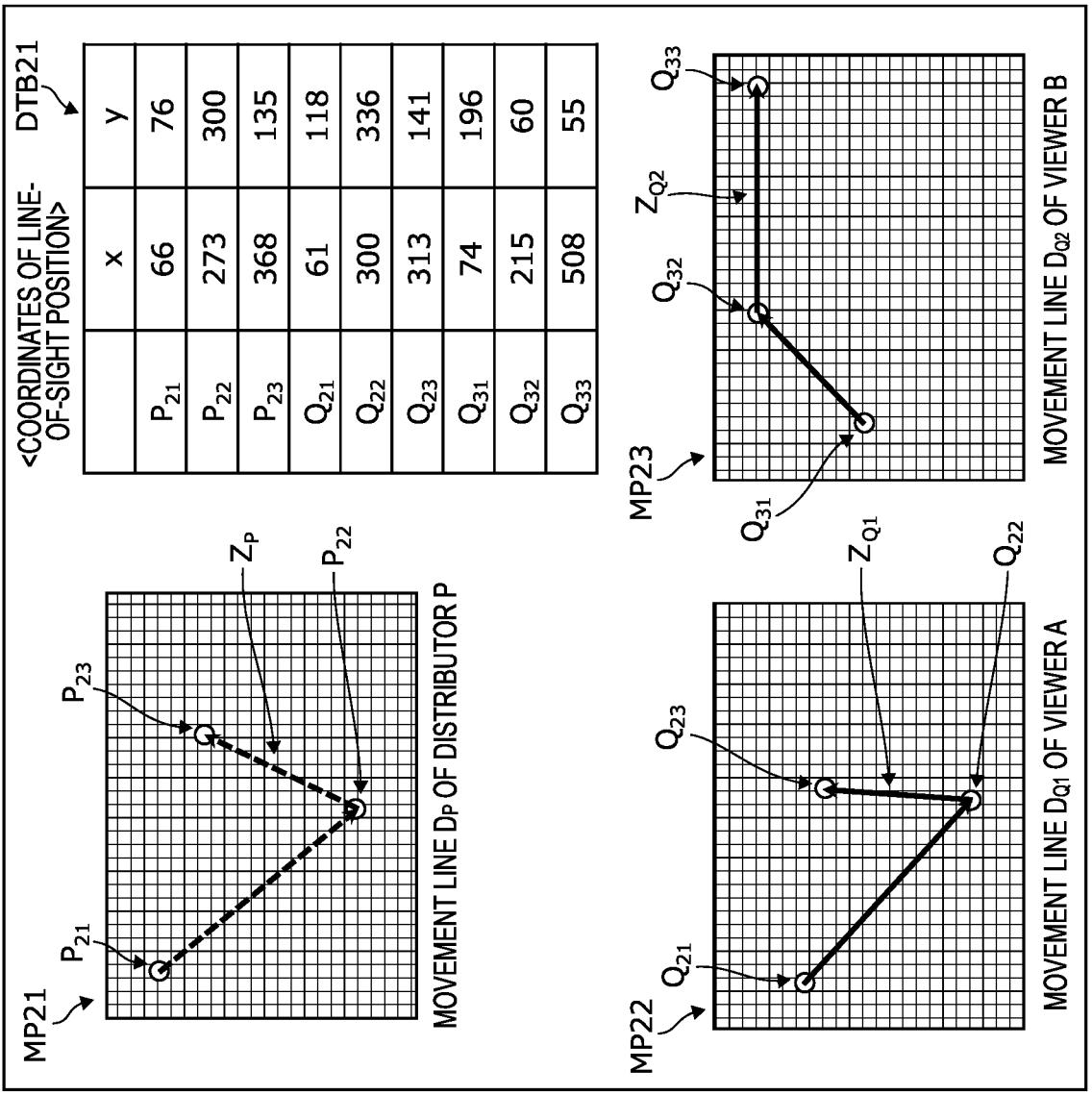
FIG. 12 is a diagram showing an example of calculation of the degree of interest of a viewer according to a first modification of the first embodiment.
Figure 13:
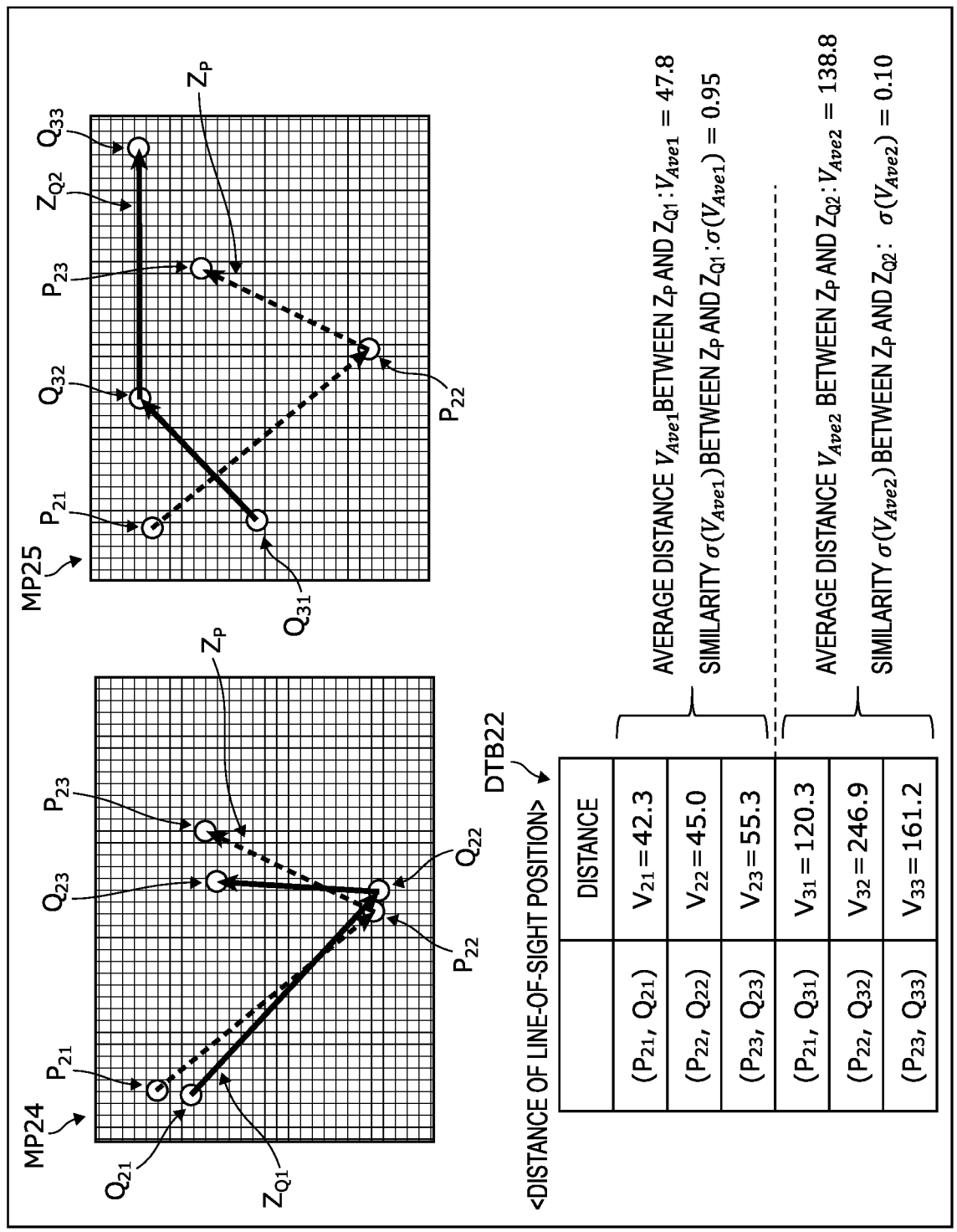
FIG. 13 is a diagram showing an example of the calculation of the degree of interest of the viewer according to the first modification of the first embodiment.

The calculation (evaluation) processing of the degree of interest in the first modification of the first embodiment will be described with reference to FIGS. 12 and 13. FIG. 12 is a diagram showing an example of calculation of the degree of interest of the viewer according to the first modification of the first embodiment. FIG. 13 is a diagram showing an example of calculation of the degree of interest of the viewer according to the first modification of the first embodiment. In FIGS. 12 and 13, an example in which the degree of interest of each of the two viewers "viewer A" and "viewer B" is calculated will be described using a specific example.

In the example shown in FIG. 12, the processing unit 111A generates, based on the information on the line-of-sight position of the distributor TC detected and accumulated while the k-th slide is displayed, the line-of-sight movement line data $Z_P$ of the distributor TC. Similarly, the processing unit 111A generates, based on the information on the line-of-sight positions of the viewers detected and accumulated while the k-th slide is displayed, line-of-sight movement line data $Z_{Q1}$ of the "viewer A" and the line-of-sight movement line data $Z_{Q2}$ of the "viewer B".

Here, the table DTB21 indicates each of line-of-sight positions $P_{21}$, $P_{22}$, and $P_{23}$ of the distributor TC at the predetermined times $t_{21}$, $t_{22}$, and $t_{23}$ extracted by the comparison unit 111C, each of coordinates of line-of-sight positions $Q_{21}$, $Q_{22}$, and $Q_{23}$ of the "viewer A", and each of coordinates of line-of-sight positions $Q_{31}$, $Q_{32}$, and $Q_{33}$ of the "viewer B".

The line-of-sight position map MP21 indicates the line-of-sight movement line data $Z_P$ of the distributor TC on the video distribution screen, the sight line position $P_{21}$ (66, 76) of the distributor TC at the predetermined time $t_{21}$, the line-of-sight position $P_{22}$ (273, 300) of the distributor TC at the predetermined time $t_{22}$, and the line-of-sight position $P_{23}$ (368, 135) of the distributor TC at the predetermined time $t_{23}$.

The line-of-sight position map MP22 indicates the line-of-sight movement line data $Z_{Q1}$ of the "viewer A" on the video distribution screen, the line-of-sight position $Q_{21}$ (61, 118) of the "viewer A" at the predetermined time $t_{21}$, the line-of-sight position $Q_{22}$ (300, 336) of the "viewer A" at the predetermined time $t_{22}$, and the line-of-sight position $Q_{23}$ (313, 141) of the "viewer A" at the predetermined time $t_{23}$.

The line-of-sight position map MP23 indicates the line-of-sight movement line data $Z_{Q2}$ of the "viewer B" on the video distribution screen, the line-of-sight position $Q_{31}$ (74, 196) of the "viewer B" at the predetermined time $t_{21}$, the line-of-sight position $Q_{32}$ (215, 60) of the "viewer B" at the predetermined time $t_{22}$, and the line-of-sight position $Q_{33}$ (508, 55) of the "viewer B" at the predetermined time $t_{23}$.

A line-of-sight position map MP24 is a diagram in which the line-of-sight movement line data $Z_P$ of the distributor TC on the video distribution screen and the line-of-sight movement line data $Z_{Q1}$ of the "viewer A" are superimposed on each other. A line-of-sight position map MP25 is a diagram in which the line-of-sight movement line data $Z_P$ of the distributor TC on the video distribution screen and the line-of-sight movement line data $Z_{Q2}$ of the "viewer B" are superimposed on each other.

First, an example of calculation of the degree of interest of the "viewer A" will be described. The comparison unit 111C extracts, based on the generated line-of-sight movement line data $Z_P$ of the distributor TC and the line-of-sight movement line data $Z_{Q1}$ of the "viewer A", the line-of-sight positions $P_{21}$, $P_{22}$, and $P_{23}$ of the distributor TC and the line-of-sight positions $Q_{21}$, $Q_{22}$, and $Q_{23}$ of the "viewer A" at the predetermined times $t_{21}$, $t_{22}$, and $t_{23}$, respectively. The comparison unit 111C calculates, using the Equation 3, a distance $V_{21}$ between the extracted line-of-sight position $P_{21}$ of the distributor TC and the line-of-sight position $Q_{21}$ of the "viewer A" at the predetermined time $t_{21}$. Similarly, the comparison unit 111C calculates, using the Equation 3, a distance $V_{22}$ between the extracted line-of-sight position $P_{22}$ of the distributor TC at the predetermined time $t_{22}$ and the line-of-sight position $Q_{22}$ of the "viewer A" and a distance $V_{23}$ between the extracted line-of-sight position $P_{23}$ of the distributor TC at the predetermined time $t_{23}$ and the line-of-sight position $Q_{23}$ of the "viewer A".

The table DTB22 indicates the distances $V_{21}$, $V_{22}$, and $V_{23}$ between the line-of-sight position of the distributor TC and the line-of-sight position of the "viewer A" at the predetermined times $t_{21}$, $t_{22}$, and $t_{23}$ calculated by the comparison unit 111C, respectively. In the example shown in FIG. 12, the distance between the line-of-sight position of the distributor TC and the line-of-sight position of the "viewer A" at each predetermined time is the distance $V_{21}$=42.3, the distance $V_{22}$=45.0, and the distance $V_{23}$=55.3.

The comparison unit 111C calculates, using the Equation 4, an average distance $V_{Ave1}$ between the line-of-sight movement line data $Z_P$ of the distributor TC and the line-of-sight movement line data $Z_{Q1}$ of the viewer (that is, a correlation (similarity) between the line-of-sight movement line data $Z_P$ of the distributor TC and the line-of-sight movement line data $Z_{Q1}$ of the viewer). In the example shown in FIG. 12, the comparison unit 111C calculates an average distance $V_{Ave1}$=47.8.

The comparison unit 111C normalizes, using the Equation 5, the calculated average distance $V_{Ave1}$=47.8, and calculates the correlation (similarity $\sigma$ ($V_{Ave1}$)) between the line-of-sight movement line data $Z_P$ of the distributor TC and the line-of-sight movement line data $Z_{Q1}$ of the viewer. Based on the calculated similarity $\sigma$ ($V_{Ave1}$)=0.95, the comparison unit 111C calculates (evaluates) that the degree of interest of the "viewer A" in the k-th slide of the shared material is 0.95, and records the calculated degree of interest in the display order table (see FIGS. 9 and 10) of the memory 12.

Similarly, an example of calculation of the degree of interest of the "viewer B" will be described. The comparison unit 111C extracts, based on the generated line-of-sight movement line data $Z_P$ of the distributor TC and the line-of-sight movement line data $Z_{Q2}$ of the "viewer B", the line-of-sight positions $P_{21}$, $P_{22}$, and $P_{23}$ of the distributor TC and the line-of-sight positions $Q_{31}$, $Q_{32}$, and $Q_{33}$ of the "viewer B" at the predetermined times $t_{21}$, $t_{22}$, and $t_{23}$, respectively. The comparison unit 111C calculates, using the Equation 3, a distance $V_{31}$ between the extracted line-of-sight position $P_{21}$ of the distributor TC and the line-of-sight position $Q_{31}$ of the "viewer B" at the predetermined time $t_{21}$. Similarly, the comparison unit 111C calculates, using the Equation 3, a distance $V_{32}$ between the extracted line-of-sight position $P_{22}$ of the distributor TC at the predetermined time $t_{22}$ and the line-of-sight position $Q_{32}$ of the "viewer B" and a distance $V_{33}$ between the extracted line-of-sight position $P_{23}$ of the distributor TC at the predetermined time $t_{23}$ and the line-of-sight position $Q_{33}$ of the "viewer B".

The table DTB22 indicates the distances $V_{31}$, $V_{32}$, and $V_{33}$ between the line-of-sight position of the distributor TC and the line-of-sight position of the "viewer B" at the predetermined times $t_{21}$, $t_{22}$, and $t_{23}$ calculated by the comparison unit 111C, respectively. In the example shown in FIG. 12, the distance between the line-of-sight position of the distributor TC and the line-of-sight position of the "viewer B" at each predetermined time is the distance $V_{31}=120.3$, the distance $V_{32}=246.9$, and the distance $V_{33}=161.2$.

The comparison unit 111C calculates, using the Equation 4, an average distance $V_{Ave2}$ between the line-of-sight movement line data $Z_P$ of the distributor TC and the line-of-sight movement line data $Z_{Q2}$ of the viewer (that is, a correlation (similarity) between the line-of-sight movement line data $Z_P$ of the distributor TC and the line-of-sight movement line data $Z_{Q2}$ of the viewer). In the example shown in FIG. 12, the comparison unit 111C calculates an average distance $V_{Ave2=138.8}$.

The comparison unit 111C normalizes, using the Equation 5, the calculated average distance $V_{Ave2=138.8}$, and calculates the correlation (similarity $\sigma$ ($V_{Ave2}$)) between the line-of-sight movement line data $Z_P$ of the distributor TC and the line-of-sight movement line data $Z_{Q2}$ of the viewer. Based on the calculated similarity $\sigma$ ($V_{Ave2}$)=0.10, the comparison unit 111C calculates (evaluates) that the degree of interest of the "viewer B" in the k-th slide of the shared material is 0.10, and records the calculated degree of interest in the display order table (see FIGS. 9 and 10) of the memory 12.

As described above, the online video distribution support system 100 according to the first modification of the first embodiment can calculate (evaluate) the degree of interest for each viewer based on the correlation (similarity) between the movement of the line of sight of the distributor TC (that is, the time-series change of the line-of-sight position) and the movement of the line of sight of the viewer (that is, the time-series change of the line-of-sight position) in the shared material display area SC11 of the video distribution screen.

Second Modification of First Embodiment

The online video distribution support system 100 according to the first embodiment described above calculates (evaluates) the degree of interest of the viewer based on the distance $D_1$ between the line-of-sight position $P_1$ of the distributor and the line-of-sight position $Q_1$ of the viewer. An example in which the online video distribution support system 100 according to the second modification of the first embodiment calculates (evaluates) the degree of interest of the viewer based on the correlation (similarity) between the line-of-sight heat map $H_P$ (an example of a first line-of-sight heat map) using a gaze time of each line-of-sight position of the distributor TC and the line-of-sight heat map HQ (an example of a second line-of-sight heat map) using a gaze time of each line-of-sight position of the viewer will be described.

The processing unit 111A of the distributor terminal PT1 according to the second modification of the first embodiment detects the line-of-sight position of the distributor TC, measures a time when the line-of-sight position is viewed (hereinafter, referred to as a "gaze time"), and records the gaze time in association with the information on the detected line-of-sight position.

Similarly, the processing unit 211A of each of the plurality of viewer terminals PS1, . . . in the second modification of the first embodiment detects the line-of-sight position of the viewer and measures the gaze time at the line-of-sight position. Each of the plurality of viewer terminals PS1, . . . associates the gaze time with the information on the detected line-of-sight position, and transmits the gaze time to the distributor terminal PT1.

At the timing when the k-th slide of the shared material displayed on the video distribution screen is switched to the (k+1)th slide, the processing unit 111A refers to the information on the line-of-sight position of the distributor TC and the information on the line-of-sight position of the viewer which are detected in the period in which the k-th slide of the shared material is displayed and accumulated in the memory 12. The processing unit 111A generates the line-of-sight heat map $H_P$ of the distributor TC based on the accumulated information on each line-of-sight position of the distributor TC and the gaze time associated with the information on the line-of-sight position. Similarly, the processing unit 111A generates the line-of-sight heat map $H_Q$ of the viewer based on the accumulated information on each line-of-sight position of the viewer and the gaze time associated with the information on the line-of-sight position.

Figure 14:
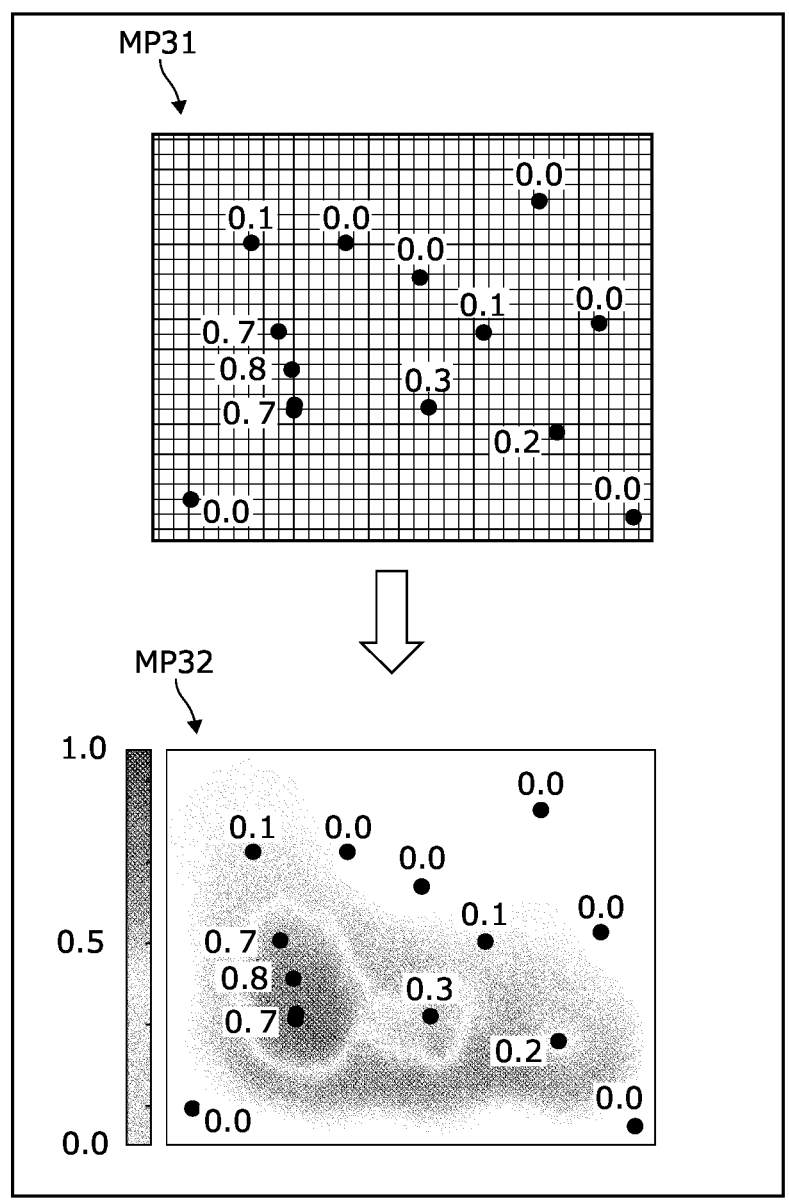
FIG. 14 is a diagram showing an example of a line-of-sight heat map according to a second modification of the first embodiment.

Here, generation processing of line-of-sight heat map MP32 will be specifically described with reference to FIG. 14. FIG. 14 is a diagram showing an example of line-of-sight heat map MP32 according to the second modification of the first embodiment. The line-of-sight heat map MP32 shown in FIG. 14 is an example, and is not limited thereto. In FIG. 14, although an example in which the line-of-sight heat map MP32 of distributor TC is generated will be described as an example, since the line-of-sight heat map of the viewer is also generated by the same processing, the description thereof is omitted here.

The processing unit 111A generates, based on the information on the line-of-sight positions of the distributor TC accumulated in the memory 12 and the gaze times associated with the information on the line-of-sight positions, a gaze map MP31 of the distributor TC in which gaze values at respective line-of-sight positions are plotted in the shared material display area SC11 on the video distribution screen. Here, although the processing of generating the gaze map MP31 and the drawings are shown to facilitate understanding of the description, the processing of generating the gaze map MP31 is not essential and maybe omitted. The unit of the gaze time shown in the gaze map MP31 shown in FIG. 14 is, for example, seconds. Here, the gaze value is a gradation for determining a color of the line-of-sight heat map.

The processing unit 111A generates line-of-sight heat map MP32 of distributor TC based on generated gaze map MP31. The line-of-sight heat map MP32 corresponds to the shared material display area SC11 in the video distribution screen, and indicates the line-of-sight position of the distributor TC by coordinates and the gaze value of the distributor TC by intensity of color or the like. Although the line-of-sight heat map MP32 shown in FIG. 14 shows an example in which a line-of-sight position (coordinates) having a large gaze value is indicated by a strong color (for example, red) and a line-of-sight position (coordinates) having a small gaze value is indicated by a weak color (for example, blue), it is needless to say that the line-of-sight heat map MP32 is not limited thereto.

In generation of line-of-sight heat map MP32, the processing unit 111A may execute weighting processing on the gaze value used for generation of line-of-sight heat map MP32 based on an elapsed time from the gaze time to the current time. For example, the processing unit 111A may calculate the gaze value used to generate the line-of-sight heat map of the distributor TC by using a weighting function that decreases the gaze value with an increase in the elapsed time from when the distributor TC starts gazing at any line-of-sight position. The weighting function used here may be a function that decreases the gaze value accompanying with an increase in the elapsed time. For example, the weighting function is any one of a linear function, a cumulative distribution function, a sigmoid function, or the like.

Accordingly, the online video distribution support system 100 according to the second modification of the first embodiment can calculate (evaluate) the degree of interest of the viewer by attaching importance to the distributor TC and the line-of-sight position of the viewer immediately before the slide of the shared material is switched. When the degree of interest of the viewer is calculated (evaluated) at every predetermined time, the online video distribution support system 100 according to the second modification of the first embodiment can calculate (evaluate) the degree of interest of the viewer by attaching importance to the latest (that is, the elapsed time from the gaze time is small) distributor TC and the line-of-sight position of the viewer in the predetermined time.

(Method of Calculating Degree of Interest in Second Modification of First Embodiment)

Here, calculation (evaluation) processing of the degree of interest in the second modification of the first embodiment will be described.

The degree of interest in the second modification of the first embodiment is calculated (evaluated) using the correlation (similarity) between the line-of-sight heat map $H_P$ of the distributor TC and the line-of-sight heat map $H_Q$ of the viewer. The line-of-sight heat map in the second modification of the first embodiment is generated using the Equation 6, the Equation 7, and the Equation 8 shown below. In the generation of the line-of-sight heat map, when the weighting function that decreases the gaze value with an increase in the elapsed time from the gaze time to the current time is not used, the processing using the Equation 6 may be omitted.

(Equation 6)

$$\text{gain}(t) = 1 - \frac{\Delta t_0}{T_0} = W_0 \quad (6)$$

(Equation 7)

$$\text{gaze}(t, x, y) = \begin{cases} C_0, & \text{LINE-OF-SIGHT POSITION} = (x, y) \\ 0, & \text{LINE-OF-SIGHT POSITION} \neq (x, y) \end{cases} \quad (7)$$

(Equation 8)

$$\text{heat}(x, y) = \frac{1}{T_0} \sum_{t=0}^{T_0} \text{gain}(t) \times \text{gaze}(t, x, y) = C_1 \quad (8)$$

Each of the Equation 6, the Equation 7 and the Equation 8 will be described. The Equation 6 is an equation for calculating a weighting coefficient Wo for weighting a gaze value $C_0$ based on a time $T_0$ at which the k-th slide is displayed and an elapsed time $\Delta t_0$ from the gaze time to the current time. Here, when a predetermined time (for example, 1 minute, 3 minutes, 5 minutes, or 10 minutes) is set as the time for calculating the degree of interest of the viewer, the time $T_0$ may be the set predetermined time. That is, the time $T_0$ is equal to the time at which the information on the line-of-sight positions of the distributor TC and the viewer is accumulated.

The Equation 7 determines the gaze value $C_0$ of each pixel corresponding to the shared material display area of the video distribution screen or the position (coordinates) corresponding to each pixel. The gaze value $C_0$ is set to a predetermined value (fixed value) between gradations 0 to 255, for example, $C_0 = 128$. The processing unit 111A determines, based on the line-of-sight position (x, y) of a person (the distributor TC or the viewer) at the gaze time t during the time $T_0$ when the k-th slide is displayed, the gaze value of the pixel corresponding to the line-of-sight position (x, y) to be $C_0$ and determines the gaze value of each pixel other than the line-of-sight position (x, y) to be 0 (zero).

The Equation 8 is an equation for calculating a gaze value $C_1$ of each pixel included in the shared material display area of the video display screen or a position (coordinates) corresponding to each pixel. The processing unit 111A multiplies, using the Equation 8, the gaze value $C_0$ of the line-of-sight position (x, y) at each gaze time t calculated using the Equation 7 by the weighting coefficient Wo calculated using the Equation 6 to calculate the gaze value $C_1$ of all the pixels included in the shared material display area or the gaze value $C_1$ of the position (coordinates) corresponding to all the pixels.

The comparison unit 111C determines, based on the gaze value $C_1$ (that is, the gradation) calculated using the Equation 8, the color of each pixel included in the shared material display area or the color of the position (coordinates) corresponding to each pixel, and generates the line-of-sight heat map $H_P$ of the distributor TC and the line-of-sight heat map $H_Q$ of the viewer. The line-of-sight heat map $H_Q$ of the viewer is generated for each viewer.

The calculation (evaluation) of the degree of interest in the second modification of the first embodiment is executed using the Equation 9 and the Equation 10 shown below.

(Equation 9)

$$ssd(H_P, H_Q) = \sum_{y=1}^{H}\sum_{x=1}^{W} \{H_P(x, y) - H_Q(x, y)\}^2 = L_S \quad (9)$$

(Equation 10)

$$\sigma(L_S) = 1 - \frac{1}{1 + e^{-\frac{L_S}{7000}+3}} \quad (10)$$

Each of the Equation 9 and the Equation 10 will be described. The Equation 9 is an equation for calculating a color difference $L_S$ between the line-of-sight heat map $H_P$ of the distributor TC and the line-of-sight heat map $H_Q$ of the viewer. The color difference $L_S$ indicates a total value (score) of a difference between the color of each pixel (each coordinate) on the line-of-sight heat map $H_P$ of the distributor TC and the color of each pixel (each coordinate) on the line-of-sight heat map $H_Q$ of the viewer. Here, a vertical width H (see FIG. 15) is a vertical width of the shared material display area SC11 in the video distribution screen. A coordinate y indicates a predetermined pixel position or coordinate in a vertical direction (an up-down direction of a paper surface). A horizontal width W (see FIG. 15) is a horizontal width of the shared material display area SC11 in the video distribution screen. A coordinate x indicates a predetermined pixel position or coordinate in a horizontal direction (a left-right direction of a paper surface).

The Equation 10 is an equation that normalizes the color difference $L_S$ between the line-of-sight heat map $H_P$ of the distributor TC and the line-of-sight heat map $H_Q$ of the viewer calculated by the Equation 9 to calculate the correlation (similarity σ ($L_S$)) between the line-of-sight heat map $H_P$ of the distributor TC and the line-of-sight heat map $H_Q$ of the viewer. Here, the correlation is, for example, a simple image difference, or image correlation between the line-of-sight heat map $H_P$ and the line-of-sight heat map $H_Q$.

At the timing when the k-th slide of the shared material displayed on the video distribution screen is switched to the (k+1)th slide, the processing unit 111A refers to the information on the line-of-sight position of the distributor TC and the gaze time at the line-of-sight position which are detected in the period in which the k-th slide of the shared material is displayed and accumulated in the memory 12. The processing unit 111A calculates, using the Equation 6, the weighting coefficient Wo for the gaze value at each line-of-sight position of the distributor TC accumulated in the memory 12. Similarly, the comparison unit 111C calculates, using the Equation 6, the weighting coefficient Wo for the gaze value at each line-of-sight position of the viewer accumulated in the memory 12.

The processing unit 111A refers to the calculated weighting coefficient Wo, the line-of-sight position, the gaze time, and the time $T_0$ at which the k-th slide of the shared material is displayed, and generates the line-of-sight heat map $H_P$ of the distributor TC and the line-of-sight heat map $H_Q$ of the viewer using the Equation 8.

The comparison unit 111C calculates, using the Equation 9, the color difference $L_S$ between the line-of-sight heat map $H_P$ of the distributor TC generated by the processing unit 111A and the line-of-sight heat map $H_Q$ of the viewer. The comparison unit 111C normalizes the calculated color difference $L_S$ using the Equation 10, and calculates a correlation (similarity σ ($L_S$)) between the line-of-sight heat map $H_P$ of the distributor TC and the line-of-sight heat map $H_Q$ of the viewer. The comparison unit 111C normalizes the calculated correlation (the similarity σ ($L_S$)), and records the normalized similarity (that is, the similarity σ ($L_S$)) in the display order table (see FIGS. 9 and 10) of the memory 12 as the degree of interest of the viewer. Here, the degree of interest may be evaluated by a value of 0 to 100 instead of a value of 0 to 1.

Figure 15:
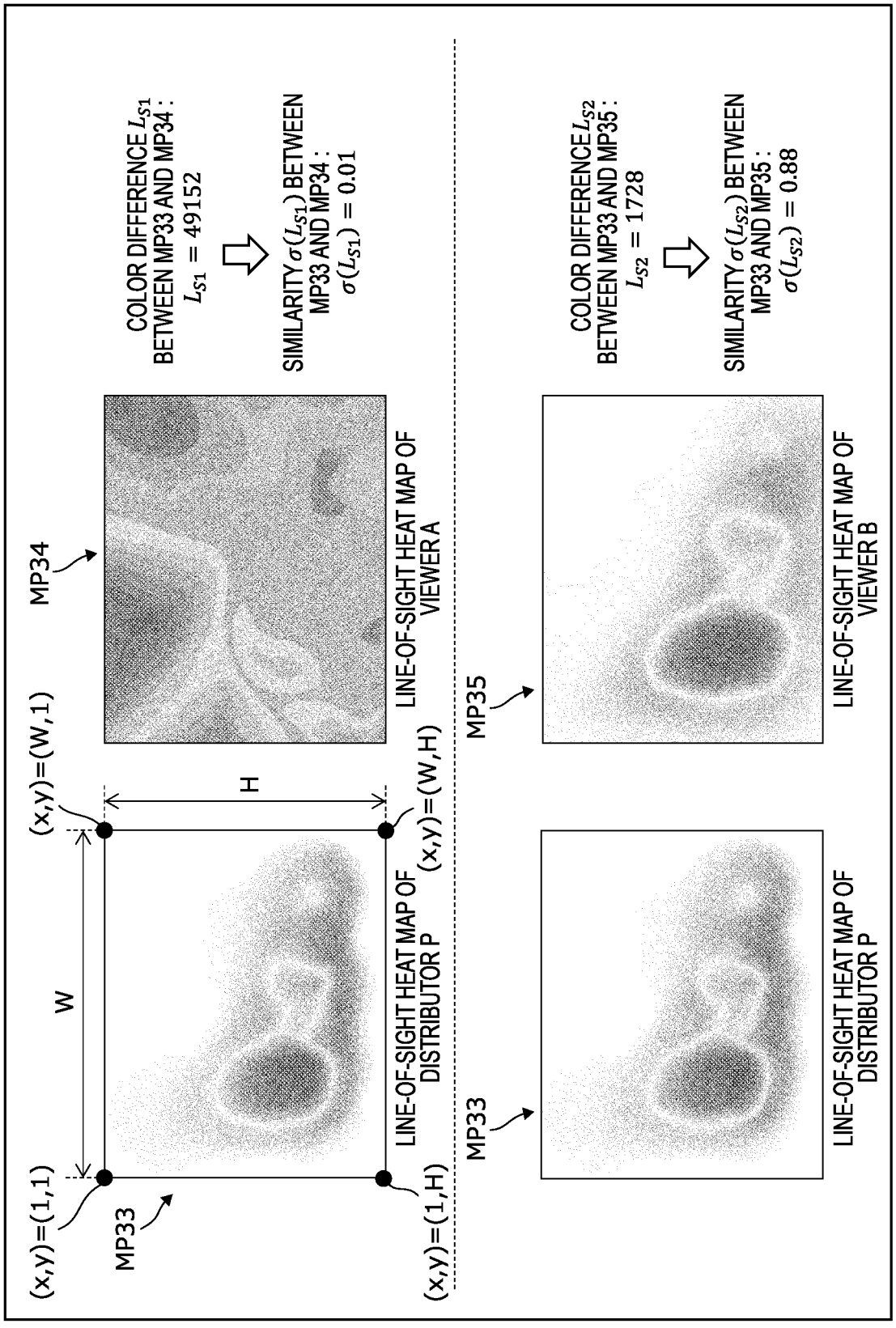
FIG. 15 is a diagram showing an example of the calculation of the degree of interest of a viewer according to the second modification of the first embodiment.

The calculation (evaluation) processing of the degree of interest in the second modification of the first embodiment will be described with reference to FIG. 15. FIG. 15 is a diagram showing an example of calculation of the degree of interest of the viewer according to the second modification of the first embodiment. In FIG. 15, an example in which the degree of interest of each of the two viewers "viewer A" and "viewer B" is calculated will be described using a specific example.

In FIG. 15, each of horizontal width W and vertical width H is shown only in the line-of-sight heat map MP33, and is omitted in each of other line-of-sight heat maps MP34 and MP35. Here, each of the horizontal width and the vertical width in line-of-sight heat maps MP34 and MP35 is equal to each of horizontal width W and vertical width H in the line-of-sight heat maps MP34 and MP35. In FIG. 15, an example in which the calculation processing of the weighting coefficient Wo shown in the Equation 6 is omitted will be described.

In the example shown in FIG. 15, the processing unit 111A generates the line-of-sight heat map MP33 of distributor TC based on information on the line-of-sight position of distributor TC detected and accumulated during time $T_0$ when the k-th slide is displayed and the gaze time. The processing unit 111A calculates the gaze value based on the information on the line-of-sight position of the "viewer A" detected and accumulated during time $T_0$ during which the k-th slide is displayed and the gaze time, and generates the line-of-sight heat map MP34 of "viewer A". Similarly, the processing unit 111A calculates the gaze value based on the information on the line-of-sight position of the "viewer B" detected and accumulated during time $T_0$ during which the k-th slide is displayed and the gaze time, and generates the line-of-sight heat map MP35 of "viewer B".

First, an example of calculation of the degree of interest of the "viewer A" will be described. The comparison unit 111C calculates, based on the generated line-of-sight heat map MP33 of distributor TC and the line-of-sight heat map MP34 of the "viewer A", a color difference $L_{S1}$ between the line-of-sight heat map MP33 and the line-of-sight heat map MP34. In the example shown in FIG. 15, the color difference $L_{S1}$ between the line-of-sight heat map MP33 and the line-of-sight heat map MP34 is "49152".

The comparison unit 111C normalizes the calculated color difference $L_{S1}$=49152, and calculates a correlation (similarity σ ($L_{S1}$)) between the line-of-sight heat map MP33 and the line-of-sight heat map MP34. Based on the calculated similarity σ ($L_{S1}$)=0.01, the comparison unit 111C calculates (evaluates) that the degree of interest of the "viewer A" in the k-th slide of the shared material is 0.01, and records the calculated degree of interest in the display order table (see FIGS. 9 and 10) of the memory 12.

Similarly, an example of calculation of the degree of interest of the "viewer B" will be described. The comparison unit 111C calculates, based on the generated line-of-sight heat map MP33 of distributor TC and the line-of-sight heat map MP35 of the "viewer B", a color difference $L_{S2}$ between the line-of-sight heat map MP33 and the line-of-sight heat map MP35. In the example shown in FIG. 15, the color difference $L_{S2}$ between the line-of-sight heat map MP33 and the line-of-sight heat map MP35 is "1728".

The comparison unit 111C normalizes the calculated color difference $L_{S2}$=1728, and calculates a correlation (similarity σ ($L_{S2}$)) between the line-of-sight heat map MP33 and the line-of-sight heat map MP35. Based on the calculated similarity σ ($L_{S2}$)=0.88, the comparison unit 111C calculates (evaluates) that the degree of interest of the "viewer B" in the k-th slide of the shared material is 0.88, and records the calculated degree of interest in the display order table (see FIGS. 9 and 10) of the memory 12.

As described above, the online video distribution support system 100 according to the second modification of the first embodiment can generate the line-of-sight heat map of the distributor TC and the line-of-sight heat map of each viewer based on the line-of-sight position of the distributor TC and the gaze time on the shared material display area SC11 of the video distribution screen. The online video distribution support system 100 can calculate (evaluate) the degree of interest for each viewer based on the generated correlation (similarity) between the line-of-sight heat map of the distributor TC and the line-of-sight heat map of the viewer.

Second Embodiment

The online video distribution support system 100 according to the first embodiment described above calculates (evaluates) the degree of interest of the viewer using the distributor terminal PT1. An example in which an online video distribution support system 100A according to the second embodiment calculates (evaluates) a degree of interest of a viewer by a server S1 connected between and communicating with a distributor terminal PT1A and each of a plurality of viewer terminals PS1, . . . . A will be described.

Figure 16:
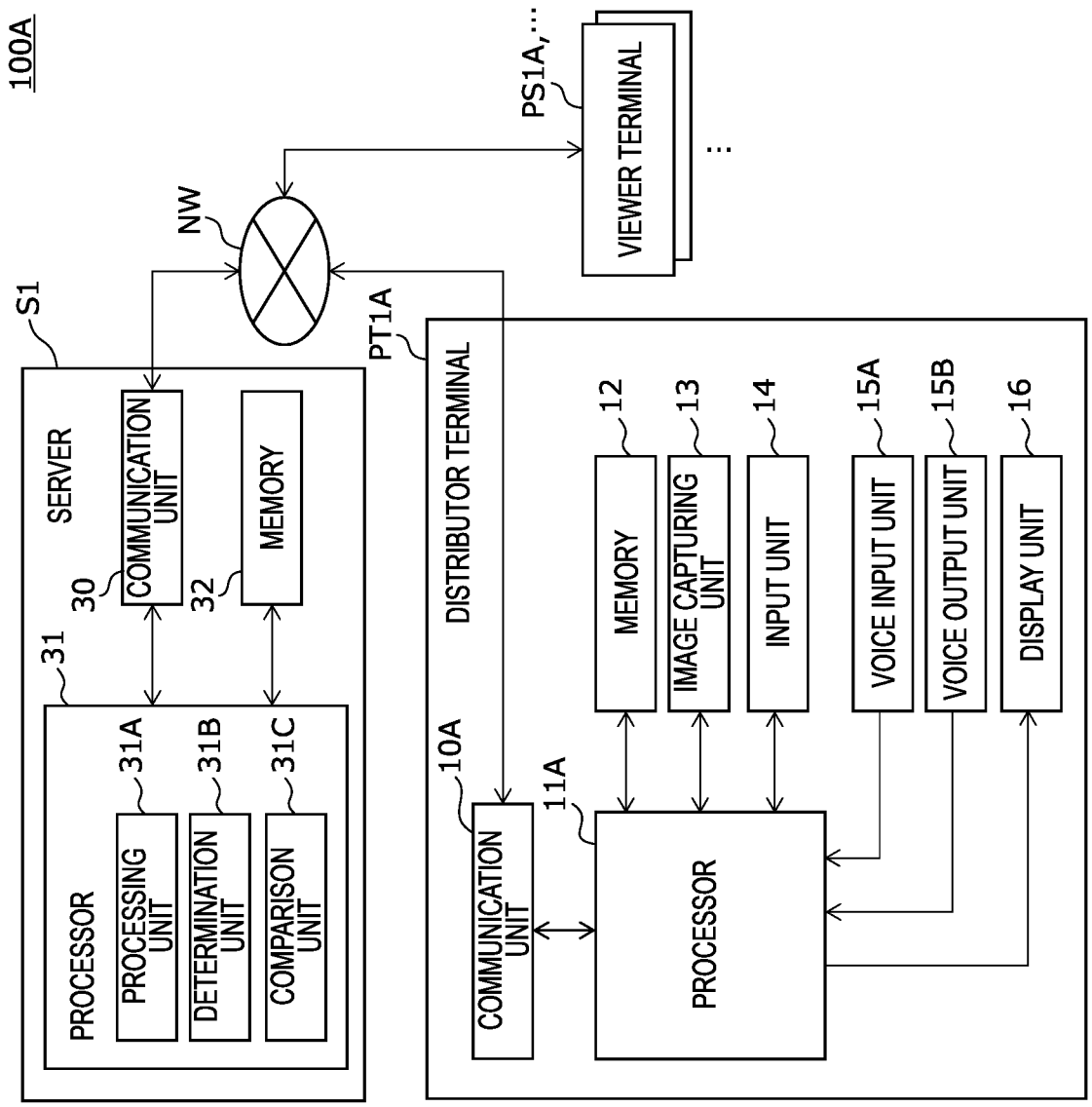
FIG. 16 is a block diagram showing an example of the internal configuration of an online video distribution support system according to a second embodiment.

An internal configuration of the online video distribution support system 100A according to the second embodiment will be described with reference to FIG. 16. FIG. 16 is a block diagram showing an example of the internal configuration of the online video distribution support system 100A according to the second embodiment. The internal configuration of the online video distribution support system 100A according to the second embodiment shown in FIG. 16 is the same as the internal configuration of the online video distribution support system 100, the distributor terminal PT1, and each of the plurality of viewer terminals PS1, . . . according to the first embodiment, the same components are denoted by the same reference numerals, and thus description thereof will be omitted.

In the online video distribution support system 100A according to the second embodiment, functions executed by the processing unit 111A, the determination unit 111B, and the comparison unit 111C of the distributor terminal PT1 according to the first embodiment are executed by the processing unit 31A, the determination unit 31B, and the comparison unit 31C of the server S1 according to the second embodiment, respectively. Specifically, the server S1 according to the second embodiment executes an operation procedure shown in FIGS. 6 and 17.

First, a distributor terminal PT1A according to the second embodiment will be described. The distributor terminal PT1A is connected to the server S1 and each of the plurality of viewer terminals PS1A, . . . via the network NW so as to be able to perform wireless communication with the server S1 and each of the plurality of viewer terminals PS1A, . . . . The processor 11A in the distributor terminal PT1A transmits a captured image (distributor image) captured by the image capturing unit 13 to the server S1. The processor 11A outputs data of a shared material determined by the distributor TC to the communication unit 10, converts a distributor TC operation received by the input unit 14 into an electric signal and outputs the electric signal to the communication unit 10. The communication unit 10A transmits various kinds of data or signals output from the processor 11C to the server S1 via the network NW. The processor 11A outputs the video distribution screen transmitted from the server S1 to the display unit 16 and causes the display unit 16 to display the video distribution screen.

The server S1 according to the second embodiment is an example of an online video distribution support apparatus, and is connected to the distributor terminal PT1A and each of the plurality of viewer terminals PS1A, . . . via the network NW so as to be capable of wired communication or wireless communication. Here, the wireless communication is, for example, communication via a wireless LAN such as Wi-Fi (registered trademark). The server S1 generates a video distribution screen displayed on the display unit 16 of the distributor terminal PT1A and a video distribution screen displayed on the display unit 26 of each of the plurality of viewer terminals PS1A, . . . . The server S1 includes a communication unit 30, a processor 31, and a memory 32.

The communication unit 30 transmits and receives data to and from the distributor terminal PT1A and the plurality of viewer terminals PS1A, . . . via the network NW. The communication unit 30 outputs a distributor image (live video) transmitted from the distributor terminal PT1A and a viewer image (live video) transmitted from each viewer terminal PS1A, . . . to the processor 31. The communication unit 30 outputs the data of the shared material transmitted from the distributor terminal PT1A, the electric signal based on the distributor TC operation, and the like to the processor 31. The communication unit 30 transmits the information generated by the determination unit 31B in the processor 31 to the distributor terminal PT1A.

The processor 31 is configured with, for example, a CPU or an FPGA, and executes various processing and controls in cooperation with the memory 32. Specifically, the processor 31 implements functions of units by referring to a program and data stored in the memory 32 and executing the program. Here, the units are, for example, a processing unit 31A, a determination unit 31B, and a comparison unit 31C. The processing unit 31A implements the same function as that of the processing unit 111A of the distributor terminal PT1 in the first embodiment. The determination unit 31B implements the same function as that of the determination unit 111B of the distributor terminal PT1 in the first embodiment. The comparison unit 31C implements the same function as that of the comparison unit 111C of the distributor terminal PT1 in the first embodiment.

The processing unit 31A executes CNN processing on the distributor image transmitted from the distributor terminal PT1A, and calculates a line-of-sight position of the distributor TC. The processing unit 31A outputs the information on the line-of-sight position of the distributor TC, which is a calculation result, to the determination unit 31B and records the information in the memory 32. Here, the processing unit 31A accumulates and records identification information (for example, a name of the distributor TC, an account name of the distributor TC, a viewing number of the online video distribution, an IP address, and a mail address of the distributor terminal PT1A) capable of identifying the distributor TC and the information of the line-of-sight position in the memory 32 in association with each other. The processing unit 31A may measure the gaze time at each line-of-sight position and record the gaze time in association with the information on the line-of-sight position.

Similarly, the processing unit 31A executes the CNN processing on the viewer image transmitted from each of the plurality of viewer terminals PS1A, . . . to calculate the line-of-sight position of the viewer. The processing unit 31A outputs the information on the line-of-sight position of the viewer, which is the calculation result, to the determination unit 31B, and records the information on the line-of-sight position of the viewer in the memory 32 for each viewer. Here, the processing unit 31A accumulates and records identification information (for example, the name of the viewer, the account name of the viewer, the viewing number of the online video distribution, the IP address of the viewer terminal, and the mail address) capable of identifying the viewer and the information of the line-of-sight position in the memory 32 in association with each other. The processing unit 31A may measure the gaze time at each line-of-sight position and record the gaze time in association with the information on the line-of-sight position.

When the determination unit 31B determines that a shared material is switched by a distributor TC operation or every predetermined time (for example, 3 minutes, 5 minutes, or 10 minutes) set in advance, the processing unit 31A refers to the information on the line-of-sight positions of the distributor TC and the plurality of viewers recorded in the memory 32, and generates various kinds of data used for calculation (evaluation) of the degree of interest of each viewer. Here, the various kinds of data are, for example, line-of-sight movement line data, and line-of-sight heat map. Here, the line-of-sight movement line data will be described in detail in a first modification of the first embodiment.

Based on the data of the shared material transmitted from the distributor terminal PT1, the determination unit 31B determines whether the shared material displayed in the shared material display area SC11 of the video distribution screen is switched by the distributor TC operation. Specifically, when the shared material is a slide material, the determination unit 31B determines whether a slide is switched. When the shared material is a material in the PDF format, the determination unit 31B determines whether a page is switched. When the shared material is live video (moving image) data, recorded video (moving image) data, image data, or the like, the determination unit 31B may determine whether there is data switching. When it is determined that the shared material is switched by the distributor TC operation, the determination unit 31B generates a control command for requesting the determination of the display order of the viewer images of the viewers displayed in the viewer image display area of the video distribution screen including the next shared material (that is, after switching by the distributor TC operation), and outputs the control command to each of the processing unit 31A and the comparison unit 31C.

The determination unit 31B may generate a control command for requesting the determination of the display order every predetermined time (for example, 3 minutes, 5 minutes, and 10 minutes) set in advance and output the control command to the comparison unit 31C. Accordingly, even when the distributor does not perform the switching operation for a long time as in the case where the shared material is the live video (moving image) data or the recorded video (moving image) data, the determination unit 31B can generate a control command based on whether the predetermined time (for example, 1 minute, 3 minutes, 5 minutes, and 10 minutes) set in advance elapses.

The comparison unit 31C analyzes the correlation (similarity) between the line-of-sight position of the distributor TC accumulated and recorded in the memory 32 and the line-of-sight position of each of the plurality of viewers from the timing at which the shared material currently displayed in the shared material display area SC11 is displayed to the timing at which the shared material is switched to the next shared material by the distributor TC operation. The determination unit 31B calculates (evaluates) the degree of interest of each viewer with respect to the shared material based on an analysis result. The comparison unit 31C may calculate (analyze) the degree of interest of the viewer based on the line-of-sight position of the distributor TC accumulated and recorded in the memory 32 during the predetermined time and the line-of-sight position of each of the plurality of viewers every predetermined time (for example, 1 minute, 3 minutes, and 5 minutes) set in advance.

Based on the analysis result, the comparison unit 31C calculates (evaluates) the degree of interest of each viewer with respect to the shared material displayed in the shared material display area SC11 at the timing when the line-of-sight position is measured. Since the method of calculating the degree of interest is the same as the calculation method described in each of the first embodiment, the first modification of the first embodiment, and the second modification of the first embodiment, the description thereof will be omitted.

The comparison unit 31C records the calculated (evaluated) degree of interest in a display order table (see FIGS. 9 and 10) recorded in the memory 32 for each viewer, and updates the display order of the viewer images of the viewers displayed in the viewer image display area SC12 of the video distribution screen including the next shared material (that is, after switching by the distributor TC operation). The comparison unit 31C calculates an average value of the degrees of interest of the plurality of viewers based on the calculated (evaluated) degrees of interest. The comparison unit 31C generates a video distribution screen including viewer bird's-eye view information (see FIG. 3) indicating an index of an approximate degree of interest of each of the plurality of viewers with respect to the shared material based on the information of the calculated average value of the degrees of interest, and outputs the video distribution screen to the distributor terminal PT1A. The distributor terminal PT1A displays the video distribution screen including the viewer bird's-eye view information transmitted from the server S1 on the display unit 16. Since the method of determining the display order is the same as that of the first embodiment, the description thereof will be omitted.

The memory 32 includes a record device including a semiconductor memory such as a RAM and a ROM and any one of storage devices such as an SSD and an HDD. The memory 32 records identification information capable of identifying the distributor TC that performs the online video distribution, identification information capable of identifying all viewers who view the online video distribution, a display order table, and the like. The memory 32 stores a learning model used in the CNN analysis processing.

Figure 17:
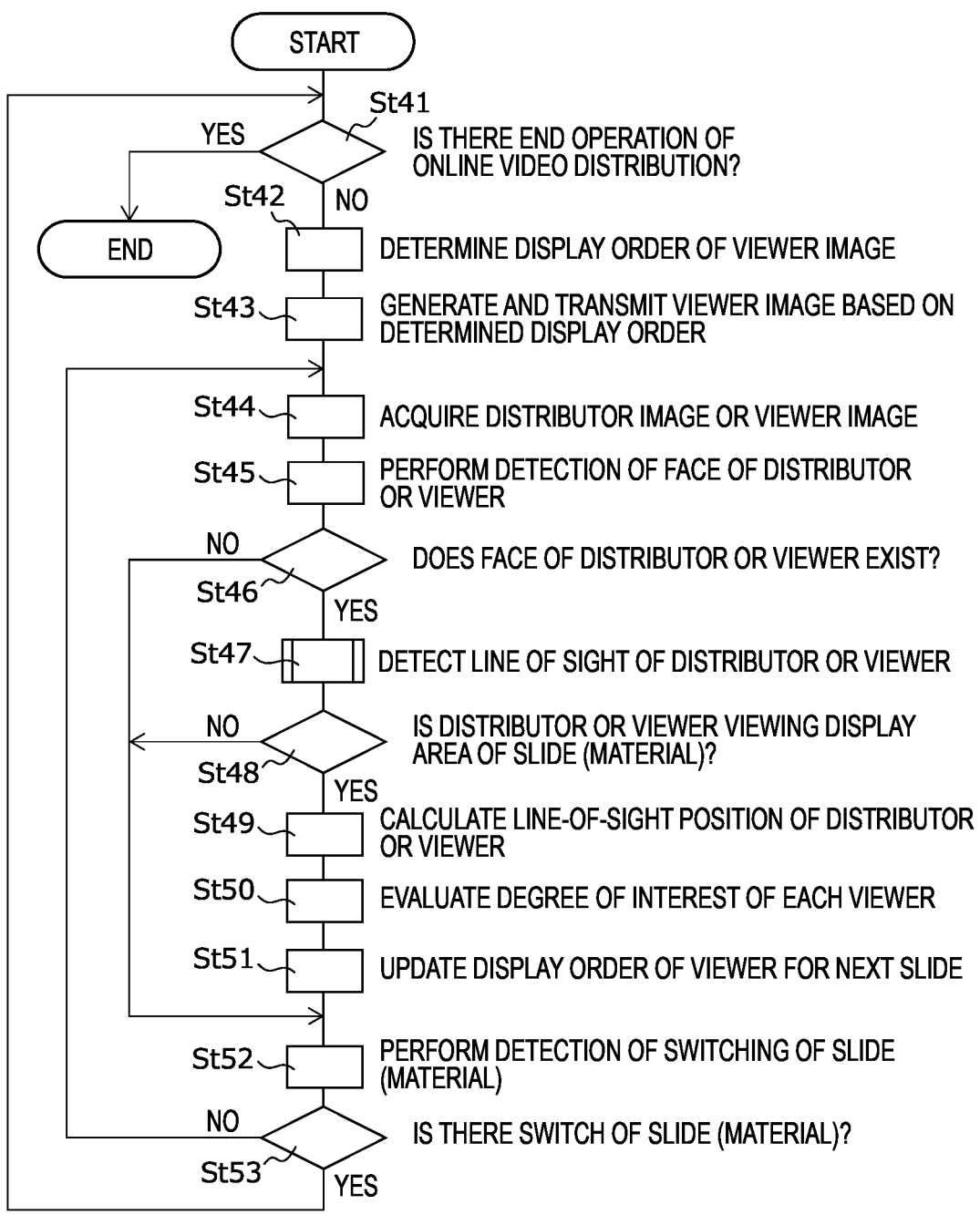
FIG. 17 is a flowchart showing an example of an operation procedure of a server according to the second embodiment.

An operation procedure of the server S1 according to the second embodiment will be described with reference to FIGS. 6 and 17. FIG. 17 is a flowchart showing an operation procedure example of the server S1 according to the second embodiment.

In the examples shown in FIGS. 6 and 17, an example in which the viewer images included in the video distribution screen are switched based on the switching of the slide of the shared material will be described, whereas it is needless to say that the switching of the viewer images included in the video distribution screen may be executed at predetermined time intervals set in advance.

The server S1 determines whether there is an end operation of ending the online video distribution by the distributor TC (St41). Specifically, the server S1 determines, based on whether a control command for requesting the end of the online video distribution transmitted from the distributor terminal PT1A is received, whether there is an end operation of ending the online video distribution.

When it is determined in the processing of step St41 that there is an end operation of ending the online video distribution by the distributor TC (that is, the control command for requesting the end of the online video distribution transmitted from the distributor terminal PT1A is received) (St41, YES), the server S1 disconnects the communication between the distributor terminal PT1A and each of the plurality of viewer terminals PS1A, . . . , and ends the online video distribution.

On the other hand, when it is determined in the processing of step St41 that there is no end operation of ending the online video distribution by the distributor TC (that is, the control command for requesting the end of the online video distribution transmitted from the distributor terminal PT1A is not received) (St41, NO), the server S1 refers to the display order table currently recorded in the memory 32, and determines, based on the display order recorded in the display order table, a display order (priority order) of the viewers displayed on the video distribution screen (St42). Since the method of determining the display order is the same as the method executed by the distributor terminal PT1 described in the first embodiment, the description thereof will be omitted.

The server S1 generates, based on the determined display order of the viewers, a video distribution screen (see FIG. 3) including viewer images of a predetermined number of viewers, and transmits the video distribution screen to the distributor terminal PT1A (St43). The distributor terminal PT1A outputs the video distribution screen transmitted from the server S1 to the display unit 16 and displays the video distribution screen on the display unit 16.

The server S1 acquires the distributor image transmitted from the distributor terminal PT1A or the viewer image transmitted from each of the viewer terminals PS1A, . . . (St44).

It is needless to say that the server S1 may simultaneously execute the processing shown in steps St44 to St50 on each of two or more captured images (distributor images or viewer images) in the processing of steps St44 to St50. The server S1 may acquire all the captured images (distributor images and viewer images) transmitted from the distributor terminal PT1A and the plurality of viewer terminals PS1A, . . . at the same timing (for example, at a timing corresponding to a frame rate of the distributor terminal PT1A, or every ¹⁄₆₀ seconds), and may sequentially or in parallel execute the processing in steps St44 to St50 for each of all the acquired captured images (distributor images and viewer images).

The server S1 specifies, based on the identification information associated with the acquired captured image (distributor image or viewer image), a person appearing in the captured image. The server S1 executes image analysis on the acquired captured image, and detects the face of the person (the distributor TC or the viewer) appearing in the captured image (St45). Based on the detection result, the server S1 determines whether the face of the person (the distributor TC or the viewer) is detected from the captured image (the distributor image or the viewer image) (St46).

When the server S1 determines that the face of the person (the distributor TC or the viewer) is detected from the captured image (the distributor image or the viewer image) in the processing of step St46 (St46, YES), the server S1 detects the line of sight of the person (St47). Specifically, the server S1 detects face parts of the person (the distributor TC or the viewer) from the captured image (the distributor image or the viewer image) (St47-1). The server S1 executes the CNN analysis on an area including both eyes of the person (the distributor TC or the viewer) in the detected face part (St47-2). Based on the result of the CNN analysis, the server S1 detects the line-of-sight position of the person (the distributor TC or the viewer) indicated by a direction in which the line of sight of the person (the distributor TC or the viewer) is directed (St47-3). The line-of-sight position calculation processing is not limited to the CNN analysis processing, and may be executed using a known technique.

On the other hand, when it is determined in the processing of step St46 that the face of the person (the distributor TC or the viewer) is not detected from the captured image (the distributor image or the viewer image) (St46, NO), the server S1 proceeds to the processing of step St52, and performs detection of the switching of the slide of the shared material displayed in the shared material display area SC11 in the video distribution screen by the distributor TC operation (St52). Specifically, the server S1 detects whether the slide of the shared material is switched based on whether the control command for requesting or notifying the switching of the slide of the shared material transmitted from the distributor terminal PT1A is received.

Based on the line-of-sight position of the person (the distributor TC or the viewer) detected in the processing of step St47, the server S1 determines whether the person (the distributor TC or the viewer) is viewing the slide of the shared material displayed on the video distribution screen (that is, whether the detected line-of-sight position is located in the shared material display area SC11 displayed on the video distribution screen) (St48).

When it is determined in the processing of step St48 that the person (the distributor TC or the viewer) appearing in the captured image is viewing the slide of the shared material displayed on the video distribution screen (St48, YES), the server S1 calculates the line-of-sight position of the person (the distributor TC or the viewer) on the shared material display area SC11 (St49).

On the other hand, when it is determined in the processing of step St48 that the person (the distributor TC or the viewer) appearing in the captured image is not viewing the slide of the shared material displayed on the video distribution screen (St48, NO), the server S1 proceeds to the processing of step St52, and detects the switching of the slide of the shared material displayed in the shared material display area SC11 in the video distribution screen by the distributor TC operation (St52).

The server S1 calculates (evaluates) the degrees of interest of one or more viewers based on the calculated line-of-sight positions (St50). The method of calculating (evaluating) the degree of interest of the viewer is the same as the method described in each of the first embodiment, the first modification of the first embodiment, and the second modification of the first embodiment, and thus the description thereof will be omitted. The server S1 updates the display order of the display order table recorded in the memory 32 based on the calculated degrees of interest of one or more viewers (St51).

The server S1 detects the switching of the slide of the shared material displayed in the shared material display area SC11 in the video distribution screen by the distributor TC operation (St52). The server S1 determines whether the slide of the shared material displayed in the shared material display area SC11 in the video distribution screen is switched by the distributor TC operation (St53).

When it is determined in the processing of step St53 that the slide of the shared material displayed in the shared material display area SC11 in the video distribution screen is switched by the distributor TC operation (St53, YES), the server S1 proceeds to the processing of step St41, and determines whether there is the operation to end the online video distribution by the distributor TC (St41).

On the other hand, when it is determined in the processing of step St53 that the slide of the shared material displayed in the shared material display area SC11 in the video distribution screen is not switched by the distributor TC operation (St53, NO), the server S1 proceeds to the processing of step St44, and acquires the distributor image transmitted from the distributor terminal PT1A or the viewer image transmitted from each of the viewer terminals PS1A, . . . (St44).

Although not shown in FIG. 17, the server S1 according to the second embodiment may refer to the display order table recorded in the memory 32 and generate, based on the degrees of interest of the plurality of viewers recorded in the display order table, the viewer bird's-eye view information (see FIG. 3) displayed in the degree-of-interest distribution information display area SC13 of the video distribution screen of the distributor terminal PT1A. In such a case, the server S1 generates a video distribution screen including the generated viewer bird's-eye view information and transmits the video distribution screen to the distributor terminal PT1A. The distributor terminal PT1A displays the video distribution screen transmitted from the server S1 on the display unit 16.

As described above, the online video distribution support system 100A according to the second embodiment can calculate (evaluate) the degree of interest of each viewer by the server S1 connected so as to be able to transmit and receive data to and from the distributor terminal PT1A and each of the plurality of viewer terminals PS1A, . . . . Accordingly, the distributor terminal PT1A does not need to execute the online video distribution processing and the calculation (evaluation) processing of the degree of interest of each viewer at the same time, and thus processing load can be reduced. By causing the server S1 to execute the calculation (evaluation) processing of the degree of interest of each viewer, the online video distribution support system 100A according to the second embodiment can more efficiently execute the calculation (evaluation) of the degree of interest of each of a large number of viewers while performing the online video distribution by the distributor terminal PT1A even when the number of viewers viewing the online video distribution is large.

As described above, the online video distribution support system 100 according to the first embodiment, the online video distribution support system 100 according to the first and second modifications of the first embodiment, and the online video distribution support system 100A according to the second embodiment include one or more computers (for example, the distributor terminal PT1, and the server S1) connected between and communicating with a plurality of viewer terminals PS1, . . . to PS1A, . . . used by N (N: an integer equal to or greater than 2) viewers who view an online video, display a video distribution screen (see FIG. 3) including a material designated by a distributor who distributes the online video, acquire information (for example, information on a position (coordinates) in the shared material display area SC21 of the video distribution screen) on a line-of-sight position of the viewer who views the video distribution screen (see FIG. 4) from each of the viewer terminals PS1, . . . to PT1A, detect and acquire, using the captured image (distributor image) obtained by capturing the distributor TC, the line-of-sight position (for example, information on the position (coordinates) in the shared material display area SC11 of the video distribution screen) of the distributor TC viewing the video distribution screen, and calculate and output the degree of interest of the viewer based on the line-of-sight position of the viewer and the line-of-sight position of the distributor TC.

Accordingly, the online video distribution support system 100 according to the first embodiment, the first and second modifications of the first embodiment, and the online video distribution support system 100A according to the second embodiment can calculate the degree of interest of the viewer based on the line-of-sight position of the distributor TC (that is, a position that the distributor TC pays attention to) and the line-of-sight position of the viewer (that is, a position that the viewer pays attention to). Therefore, the online video distribution support systems 100 and 100A can efficiently support improvement of the distribution content by the distributor TC by outputting the degree of interest of the viewer with respect to the shared material which is the distribution content of the distributor TC performing the online video distribution.

As described above, the online video distribution support system 100 according to the first embodiment and the online video distribution support system 100A according to the second embodiment calculate and output the degree of interest of the viewer based on the difference (distance $D_1$) between the line-of-sight position of the distributor TC and the line-of-sight position of the viewer. Accordingly, the online video distribution support system 100 according to the first embodiment and the online video distribution support system 100A according to the second embodiment can calculate the degree of interest of the viewer based on the difference (distance $D_1$) between the line-of-sight position of the distributor TC and the line-of-sight position of the viewer. Therefore, the online video distribution support systems 100 and 100A efficiently calculate the correlation (that is, the similarity) between the shared material, which is the distribution content of the distributor TC performing the online video distribution, and the degree of interest of the viewer viewing the shared material, and output the calculated degree of interest of the viewer, thereby efficiently supporting the improvement of the distribution content by the distributor TC.

As described above, the online video distribution support system 100 according to the first embodiment and the online video distribution support system 100A according to the second embodiment accumulate the line-of-sight position of the distributor TC and the line-of-sight position of the viewer for a predetermined period, and calculate the difference (distance $D_1$) between the line-of-sight position (line-of-sight position $P_1$) at which the distributor TC views the longest time among the accumulated line-of-sight positions of the distributor TC for the predetermined period and the line-of-sight position (line-of-sight position $Q_1$) at which the viewer views the longest time among the accumulated line-of-sight positions of the viewers for the predetermined period. Here, the difference indicates a difference in coordinates between the line-of-sight position (coordinates) of the distributor TC and the line-of-sight position (coordinates) of the viewer. Accordingly, the online video distribution support system 100 according to the first embodiment and the online video distribution support system 100A according to the second embodiment can calculate the degree of interest of the viewer based on the position (the line-of-sight position $P_1$) that the distributor TC pays the most attention to in the shared material displayed on the video distribution screen, and the position (the line-of-sight position $Q_1$) that the viewer pays the most attention to in the shared material displayed on the video distribution screen. Therefore, the online video distribution support systems 100 and 100A can efficiently calculate the correlation (that is, the similarity) between the shared material, which is the distribution content of the distributor TC performing the online video distribution, and the degree of interest of the viewer viewing the shared material.

As described above, the online video distribution support system 100 according to the first modification of the first embodiment and the online video distribution support system 100A according to the second embodiment accumulate the line-of-sight position (the line-of-sight position $P_i$) of the distributor TC and the line-of-sight position (the line-of-sight position $Q_i$) of the viewer for a predetermined period, generate the line-of-sight movement line data $Z_P$ (an example of the first line-of-sight movement line data) indicating the time-series change of the line-of-sight position of the distributor TC and the line-of-sight movement line data $Z_Q$ (an example of the second line-of-sight movement line data) indicating the time-series change of the line-of-sight position of the viewer based on the accumulated line-of-sight positions of the distributor TC and the viewer in the predetermined period, and calculate and output the degree of interest based on the similarity σ ($V_{Ave}$) between the line-of-sight movement line data $Z_P$ and the line-of-sight movement line data $Z_Q$. Accordingly, the online video distribution support system 100 according to the first modification of the first embodiment and the online video distribution support system 100A according to the second embodiment can calculate the degree of interest of the viewer based on the line-of-sight movement line data $Z_P$ of the distributor TC in the shared material display area SC11 displayed on the video distribution screen and the line-of-sight movement line data $Z_Q$ of the viewer in the shared material display area SC21 displayed on the video distribution screen. Accordingly, the online video distribution support systems 100 and 100A can efficiently calculate the correlation (that is, the similarity) between the shared material, which is the distribution content of the distributor TC performing the online video distribution, and the degree of interest of the viewer viewing the shared material. Therefore, the online video distribution support systems 100 and 100A efficiently calculate the correlation (that is, the similarity) between the shared material, which is the distribution content of the distributor TC performing the online video distribution, and the degree of interest of the viewer viewing the shared material, and output the calculated degree of interest of the viewer, thereby efficiently supporting the improvement of the distribution content by the distributor TC.

As described above, the online video distribution support system 100 according to the second modification of the first embodiment and the online video distribution support system 100A according to the second embodiment accumulate the line-of-sight position of the distributor TC and the line-of-sight position of the viewer for a predetermined period, respectively, generate, using the accumulated line-of-sight positions of the distributor TC and the viewer for the predetermined period, a line-of-sight heat map $H_P$ (an example of a first line-of-sight heat map) in which the gaze value $C_1$ (an example of a score) of the distributor TC for each line-of-sight position on the video distribution screen is mapped and a line-of-sight heat map $H_Q$ (an example of a second line-of-sight heat map) in which the gaze value $C_1$ of the viewer for each line-of-sight heat map on the video distribution screen is mapped, and calculate and output the degree of interest of the viewer based on the similarity σ ($L_S$) between the line-of-sight heat map $H_P$ and the line-of-sight heat map $H_Q$. Accordingly, the online video distribution support system 100 according to the first modification of the first embodiment and the online video distribution support system 100A according to the second embodiment can generate, based not only on the line-of-sight position but also on the gaze time for each line-of-sight position, the line-of-sight heat map $H_P$ indicating an attention map of the distributor TC on the shared material display area SC11 displayed on the video distribution screen and the line-of-sight heat map $H_Q$ indicating an attention map of the viewer on the shared material display area SC21 displayed on the video distribution screen, and calculate the degree of interest of the viewer based on the similarity σ ($L_S$) between the generated line-of-sight heat map $H_P$ and the line-of-sight heat map $H_Q$. Therefore, the online video distribution support systems 100 and 100A can efficiently and adaptively calculate the correlation (that is, the similarity) between the shared material, which is the distribution content of the distributor TC performing the online video distribution, and the degree of interest of the viewer viewing the shared material.

As described above, the line-of-sight positions in the online video distribution support system 100 according to the second modification of the first embodiment and the online video distribution support system 100A according to the second embodiment include information on the gaze time (an example of a detection time), calculate the elapsed time $\Delta t_0$ from the accumulated detection time to the current time for each line-of-sight position, determine the weighting coefficient Wo of a viewing time for each line-of-sight position based on the elapsed time $\Delta t_0$, and generate the line-of-sight heat map $H_P$ in which the gaze value $C_1$ of the distributor for each line-of-sight position multiplied by the determined weighting coefficient Wo is mapped and the line-of-sight heat map $H_Q$ in which the gaze value $C_1$ of the viewer for each line-of-sight position multiplied by the weighting coefficient Wo is mapped. Accordingly, the online video distribution support system 100 according to the first modification of the first embodiment and the online video distribution support system 100A according to the second embodiment can generate, by using the weighting coefficient based on the elapsed time $\Delta t_0$ from the time (gaze time) at which each line-of-sight position is viewed, the line-of-sight heat map that more adaptively evaluates the positions (coordinates) that the distributor TC and the viewer are paying attention to. Therefore, the online video distribution support systems 100 and 100A can more adaptively calculate the degree of interest of the viewer viewing the shared material.

As described above, the predetermined period in the online video distribution support system 100 according to the first embodiment, the first and second modifications of the first embodiment, and the online video distribution support system 100A according to the second embodiment is a period (for example, time $T_0$) from the timing at which the k-th (k: an integer of 1 or more) shared material is displayed on the video distribution screen by the operation of the distributor TC to the timing at which the display is switched to the (k+1)th shared material. Accordingly, the online video distribution support system 100 according to the first embodiment, the first and second modifications of the first embodiment, and the online video distribution support system 100A according to the second embodiment can calculate and output the degree of interest of each of the N viewers for each slide, page, or shared data of the shared material, and thus can efficiently support the improvement of the distribution content by the distributor TC.

As described above, the online video distribution support system 100 according to the first embodiment and the first and second modifications of the first embodiment, and the online video distribution support system 100A according to the second embodiment classify the N viewers into h levels (h: an integer of 2 or more) based on the calculated degrees of interest of the N viewers, and generates and displays the video distribution screen (see FIG. 3) including the degree-of-interest distribution information (see FIG. 3) including the number of viewers classified into the h levels. Accordingly, the online video distribution support system 100 according to the first embodiment, the first and second modifications of the first embodiment, and the online video distribution support system 100A according to the second embodiment can efficiently support the distributor TC to improve the real-time distribution content by presenting the currently calculated degree-of-interest distribution of N viewers to the distributor TC.

As described above, the video distribution screens generated by the online video distribution support system 100 according to the first embodiment and the first and second modifications of the first embodiment and the online video distribution support system 100A according to the second embodiment are displayed including viewer images in which M (M: an integer of 1 or more, M≤N) viewers are captured, and the M viewer images displayed on the video distribution screen (see FIG. 3) are determined based on the degrees of interest of the N viewers. Accordingly, the online video distribution support system 100 according to the first embodiment and the first and second modifications of the first embodiment, and the online video distribution support system 100A according to the second embodiment can generate a video distribution screen including the viewer images of M viewers and display the video distribution screen on the display unit 16. Therefore, the distributor TC can visually confirm the state of each of the M viewers in real time.

As described above, the distributor terminal PT1 according to the first embodiment and the first and second modifications of the first embodiment includes the communication unit 10 (an example of an acquisition unit) that acquires information on line-of-sight positions of N (N is an integer equal to or greater than 2) viewers who view an online video, the display unit 16 (an example of an output unit) that outputs the video distribution screen (see FIG. 3) including the shared material (an example of the material) designated by the distributor TC that distributes the online video, the processing unit 111A (an example of a detection unit) that detects the line-of-sight position of the distributor who views the video distribution screen using a captured image (distributor image) obtained by capturing the distributor TC, and the comparison unit 111C (an example of a control unit) that calculates and outputs the degree of interest of the viewer based on the line-of-sight position of the viewer and the line-of-sight position of the distributor TC.

Accordingly, the distributor terminal PT1 according to the first embodiment and the first and second modifications of the first embodiment is an online video distribution support system including one or more computers (that is, the distributor terminal PT1), and can calculate the degree of interest of the viewer based on the line-of-sight position of the distributor TC (that is, the position that the distributor TC pays attention to) and the line-of-sight position of the viewer (that is, the position that the viewer pays attention to). Therefore, the distributor terminal PT1 efficiently calculates the correlation (that is, the similarity) between the shared material, which is the distribution content of the distributor TC performing the online video distribution, and the degree of interest of the viewer viewing the shared material, and outputs the calculated degree of interest of the viewer, thereby efficiently supporting the improvement of the distribution content by the distributor TC.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present invention. Components in the various embodiments mentioned above may be combined optionally in the range without deviating from the spirit of the invention.

The present disclosure is useful as an online video distribution support method, an online video distribution support apparatus, and an online video distribution support system that calculate a degree of interest of a viewer with respect to a distribution content of a distributor that distributes a live video online and efficiently support improvement of the distribution content by the distributor.

The invention claimed is:

1. An online video distribution support method to be executed by an online video distribution support system, the online video distribution support system comprising one or more computers connected to communicate with a plurality of viewer terminals used by N (N is an integer equal to or larger than 2) viewers who view an online video, the online video distribution support method comprising:
   displaying a video distribution screen including a material designated by a distributor that distributes the online video;
   acquiring information on a line-of-sight position of each of the viewers on the video distribution screen from each of the viewer terminals;
   detecting and acquiring a line-of-sight position of the distributor on the video distribution screen by using a captured image obtained by capturing the distributor; and
   calculating and outputting a degree of interest of each of the viewers based on the line-of-sight position of the corresponding viewer and the line-of-sight position of the distributor.

2. The online video distribution support method according to claim 1,
   wherein the degree of interest of each of the viewer is calculated and output based on a difference between the line-of-sight position of the distributor and the line-of-sight position of the corresponding viewer.

3. The online video distribution support method according to claim 2, further comprising:
   accumulating line-of-sight positions of the distributor and line-of-sight positions of each of the viewers for a predetermined period,
   wherein the difference is a difference between a line-of-sight position of the distributor at which the distributor views for a longest time among the line-of-sight positions of the distributor accumulated for the predetermined period and a line-of-sight position of each of the viewers at which the corresponding viewer views for a longest time among the line-of-sight positions of the corresponding viewer accumulated for the predetermined period.

4. The online video distribution support method according to claim 1, further comprising
   accumulating line-of-sight positions of the distributor and line-of-sight positions of each of the viewers for a predetermined period; and
   generating first line-of-sight movement line data indicating a time-series change of the line-of-sight position of the distributor and second line-of-sight movement line data indicating a time-series change of the line-of-sight position of each of the viewers based on the line-of-sight positions of the distributor and the line-of-sight positions of the corresponding viewer accumulated for the predetermined period,
   wherein the degree of interest of each of the viewers is calculated and output based on similarity between the first line-of-sight movement line data and the second line-of-sight movement line data.

5. The online video distribution support method according to claim 1, further comprising:

accumulating line-of-sight positions of the distributor and line-of-sight positions of each of the viewers for a predetermined period; and generating a first line-of-sight heat map in which a score of the distributor for each of the line-of-sight positions of the distributer on the video distribution screen is mapped and a second line-of-sight heat map in which a score of each of the viewers for each of the line-of-sight positions of the corresponding viewer on the video distribution screen is mapped using the line-of-sight positions of the distributor and the line-of-sight positions of the corresponding viewer accumulated for the predetermined period, wherein the degree of interest of the viewer is calculated and output based on similarity between the first line-of-sight heat map and the second line-of-sight heat map.

6. The online video distribution support method according to claim 5, wherein the line-of-sight position includes information on a detection time, wherein the online video distribution support method further comprises:
calculating an elapsed time from the detection time to a current time for each of the line-of-sight positions accumulated for the predetermined period,
determining a weighting coefficient of a viewing time for each of the line-of-sight positions based on the elapsed time, and wherein the score mapped in the first line-of-sight heat map is a score of the distributor for each of the line-of-sight positions multiplied by the weighting coefficient, and the score mapped in the second line-of-sight heat map is a score of the viewer for each of the line-of-sight positions multiplied by the weighting coefficient.

7. The online video distribution support method according to claim 3, wherein the predetermined period is a period from a timing at which a k-th (k: an integer of 1 or more) material is displayed on the video distribution screen by an operation of the distributor to a timing at which the material is switched to a (k+1)th material.

8. The online video distribution support method according to claim 1, wherein the N viewers are classified into h (h: an integer equal to or greater than 2) levels based on the degree of interest of each of the N viewers, and wherein the video distribution screen is generated and displayed to include degree-of-interest distribution information including information on the number of viewers classified into each of the h levels.

9. The online video distribution support method according to claim 1, wherein the video distribution screen is displayed to include viewer images in which M (M is an integer of 1 or more, M≤N) viewers are respectively captured, and wherein the viewer images of the M viewers to be displayed on the video distribution screen are determined based on the degree of interest of each of the N viewers.

10. An online video distribution support apparatus comprising one or more computers, the online video distribution support apparatus comprising:

an acquisition unit configured to acquire information on a line-of-sight position of each of N (N is an integer equal to or greater than 2) viewers viewing an online video;

an output unit configured to output a video distribution screen including a material designated by a distributor that distributes the online video;

a detection unit configured to detect a line-of-sight position of the distributor on the video distribution screen by using a captured image obtained by capturing the distributor; and a control unit configured to calculate and output a degree of interest of each of the viewers based on the line-of-sight position of the corresponding viewer and the line-of-sight position of the distributor.

11. An online video distribution support system comprising one or more computers, the online video distribution support system comprising:

a plurality of viewer terminals used by N (N is an integer equal to or greater than 2) viewers viewing an online video; and a distributor terminal connected to communicate with the plurality of viewer terminals and capable of accepting an operation of a distributor that distributes the online video, wherein each of the plurality of viewer terminals is configured to:
display a video distribution screen including a material transmitted from the distributor terminal, and
detect a line-of-sight position of the corresponding viewer on the video distribution screen by using a captured image obtained by capturing the corresponding viewer viewing the video distribution screen, and transmit the line-of-sight position to the distributor terminal, wherein the distributor terminal is configured to:
acquire information on the line-of-sight position of each the viewers transmitted from each of the viewer terminals,
display the video distribution screen including the material,
detect and acquire a line-of-sight position of the distributor on the video distribution screen by using a captured image obtained by capturing the distributor, and
calculate and output a degree of interest of each of the viewers based on the line-of-sight position of the corresponding viewer and the line-of-sight position of the distributor.

* * * * *